United States Patent
Choi et al.

(10) Patent No.: US 9,820,302 B2
(45) Date of Patent: Nov. 14, 2017

(54) CHANNEL ACCESS METHOD IN WIRELESS COMMUNICATION SYSTEM AND APPARATUS FOR SAME

(71) Applicant: LG Electronics Inc., Seoul (KR)

(72) Inventors: Jinsoo Choi, Anyang-si (KR);
Seunghee Han, Anyang-si (KR);
Jinsam Kwak, Anyang-si (KR);
Yongho Seok, Anyang-si (KR); Jeongki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 138 days.

(21) Appl. No.: 14/394,185

(22) PCT Filed: Apr. 15, 2013

(86) PCT No.: PCT/KR2013/003139
§ 371 (c)(1),
(2) Date: Oct. 13, 2014

(87) PCT Pub. No.: WO2013/154403
PCT Pub. Date: Oct. 17, 2013

(65) Prior Publication Data
US 2015/0124784 A1 May 7, 2015

Related U.S. Application Data

(60) Provisional application No. 61/623,578, filed on Apr. 13, 2012.

(51) Int. Cl.
*H04J 3/00* (2006.01)
*H04W 74/04* (2009.01)
(Continued)

(52) U.S. Cl.
CPC .......... *H04W 74/04* (2013.01); *H04W 72/02* (2013.01); *H04W 74/0808* (2013.01)

(58) Field of Classification Search
CPC ..... H04W 84/12; H04W 84/18; H04W 74/04; H04W 74/0833; H04W 74/08; H04W 72/0446; H04W 72/02; H04W 72/0808
See application file for complete search history.

(56) References Cited

U.S. PATENT DOCUMENTS

2005/0003794 A1* 1/2005 Liu .................. H04W 52/0216
455/355
2005/0018624 A1* 1/2005 Meier .............. H04L 29/12028
370/318

(Continued)

FOREIGN PATENT DOCUMENTS

| KR | 1020050044170 | 5/2005 |
| KR | 1020080083086 | 9/2008 |
| KR | 1020110124908 | 11/2011 |

*Primary Examiner* — Ian N Moore
*Assistant Examiner* — Phong La
(74) *Attorney, Agent, or Firm* — Dentons US LLP

(57) ABSTRACT

One embodiment of the present invention is a method for performing channel access using a first station (STA) in a wireless communication system, comprising: a step of receiving a traffic indication map (TIM) bitmap; and a step of attempting channel access for a wireless medium in a first time period indicated by the first TIM bitmap. The first STA attempts channel access for the wireless medium in a third time period which is one of the second time periods indicated by the TIM bitmap in the event that the first STA senses an operation of a second STA relating to the wireless medium in the first time period.

10 Claims, 22 Drawing Sheets

(51) Int. Cl.
*H04W 72/02* (2009.01)
*H04W 74/08* (2009.01)

(56) References Cited

U.S. PATENT DOCUMENTS

| | | | | |
|---|---|---|---|---|
| 2006/0072488 A1* | 4/2006 | Meier | ............... | H04L 12/1886 370/312 |
| 2008/0049703 A1* | 2/2008 | Kneckt | ............... | H04W 68/00 370/342 |
| 2008/0146253 A1* | 6/2008 | Wentink | ............ | H04W 52/0216 455/458 |
| 2008/0165746 A1* | 7/2008 | Sung | ............... | H04W 56/0045 370/337 |
| 2008/0219196 A1* | 9/2008 | Ptasinski | ............ | H04W 52/02 370/311 |
| 2009/0103501 A1* | 4/2009 | Farrag | ............... | H04W 74/02 370/337 |
| 2009/0285165 A1* | 11/2009 | Berglund | ............ | H04W 72/082 370/329 |
| 2009/0310578 A1 | 12/2009 | Convertino et al. | | |
| 2010/0061284 A1* | 3/2010 | Chen | ............... | H04W 52/10 370/311 |
| 2010/0158039 A1* | 6/2010 | Koide | ............... | H04B 3/542 370/447 |
| 2011/0130100 A1* | 6/2011 | Chen | ............... | H04W 24/00 455/67.11 |
| 2011/0305216 A1* | 12/2011 | Seok | ............... | H04W 74/08 370/329 |
| 2012/0231828 A1* | 9/2012 | Wang | ............... | H04W 74/04 455/509 |
| 2012/0263086 A1* | 10/2012 | Liu | ............... | H04W 52/0216 370/311 |
| 2013/0143606 A1* | 6/2013 | Merlin | ............ | H04W 52/0209 455/458 |
| 2013/0235720 A1* | 9/2013 | Wang | ............... | H04W 28/0278 370/229 |

* cited by examiner

FIG. 13
(a) 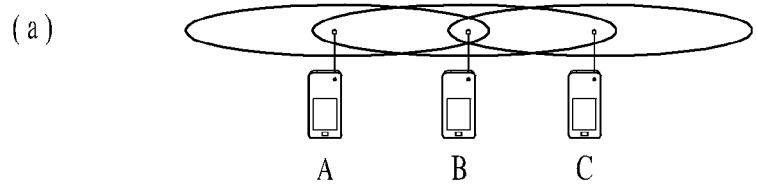
(b) 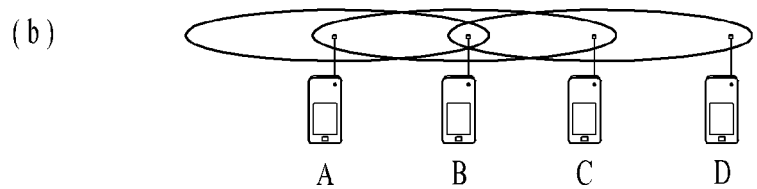
FIG. 14
(a) 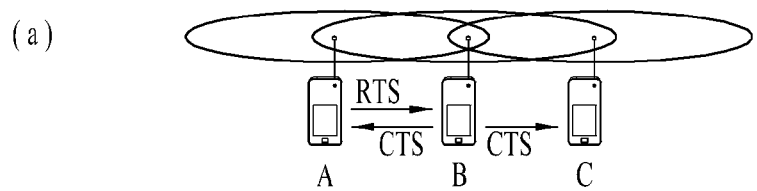
(b) 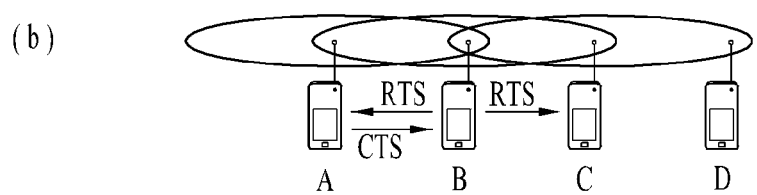

D1 = aRxRFDelay + aRxPLCPDelay (referenced from the end of the last symbol of a frame on the medium)
D2 = D1 + Air Propagation Time
Rx/Tx = aRXTXTurnaroundTime (begins with a PHYTXSTART.request)
M1 = M2 = aMACProcessingDelay
CCAdel = aCCA Time - D1

CHANNEL ACCESS METHOD IN WIRELESS COMMUNICATION SYSTEM AND APPARATUS FOR SAME

This application is a 35 USC §371 National Stage entry of International Application No. PCT/KR2013/003139 filed on Apr. 15, 2013, and claims priority to U.S. Provisional Application No. 61/623,578 filed on Apr. 13, 2012, all of which are hereby incorporated by reference in their entireties as if fully set forth herein.

TECHNICAL FIELD

The present invention relates to a wireless communication system and, more particularly, to a channel access method in a wireless LAN system and an apparatus supporting the same.

BACKGROUND ART

With recent development of information communication technologies, a variety of wireless communication technologies have been developed. From among such technologies, WLAN is a technology that allows wireless access to the Internet at home, in businesses, or in specific service providing areas using a mobile terminal, such as a personal digital assistant (PDA), a laptop computer, and a portable multimedia player (PMP), based on radio frequency technology.

In order to overcome limited communication speed, which has been pointed out as a weak point of WLAN, technical standards have recently introduced a system capable of increasing the speed and reliability of a network while extending a coverage region of a wireless network. For example, IEEE 802.11n supports high throughput (HT) with a maximum data processing speed greater than or equal to 540 Mbps. In addition, Multiple Input and Multiple Output (MIMO) technology, which employs multiple antennas for both a transmitter and a receiver in order to minimize transmission errors and to optimize a data rate, has been introduced.

DISCLOSURE

Technical Problem

An object of the present invention devised to solve the problem lies in a slotted channel access method in a wireless communication system, preferably, in a WLAN system and an apparatus for the same.

Another object of the present invention is to provide a method to prevent unnecessary power consumption and delayed transmission of a terminal resulting from the operation of contention-based channel access and an apparatus for the same.

Objects of the present invention are not limited to the aforementioned objects, and other objects of the present invention which are not mentioned above will become apparent to those having ordinary skill in the art upon examination of the following description.

Technical Solution

According to a first aspect of the present invention, provided herein is a method for performing channel access by a first station (STA) in a wireless communication system, including receiving a traffic indication map (TIM) bitmap, and attempting channel access for a wireless medium in a first time interval indicated by the TIM bitmap, wherein, when the first STA senses an operation of a second STA related to the wireless medium in the first time interval, the first STA attempts channel access for the wireless medium in a third time interval, the third time interval being one of second time intervals indicated by the TIM bitmap.

According to a second aspect of the present invention, provided herein is a method for supporting channel access of a first station (STA) by an access point (AP) in a wireless communication system, including transmitting a traffic indication map (TIM) bitmap, and receiving a frame for channel access for a wireless medium from the first STA in a first time interval indicated by the TIM bitmap or a third time interval, the third time interval being one of second time intervals indicated by the TIM bitmap, wherein, when an operation of a second STA related to the wireless medium is performed in the first time interval, the frame for channel access is received from the first STA in the third time interval.

According to a third aspect of the present invention, provided herein is a station (STA) in a wireless communication system including a transceiver for transmission and reception of a radio frequency signal, and a processor, wherein the processor receives a traffic indication map (TIM) bitmap, and attempts channel access for a wireless medium in a first time interval indicated by the TIM bitmap, wherein, when the first STA senses an operation of a second STA related to the wireless medium in the first time interval, the first STA attempts channel access for the wireless medium in a third time interval, the third time interval being one of second time intervals indicated by the TIM bitmap.

According to a fourth aspect of the present invention, provided herein is an access point (AP) in a wireless communication system including a transceiver for transmission and reception of a radio frequency signal, and a processor, wherein the processor transmits a traffic indication map (TIM) bitmap, and receives a frame for channel access for a wireless medium from the first STA in a first time interval indicated by the TIM bitmap or a third time interval, the third time interval being one of second time intervals indicated by the TIM bitmap, wherein, when an operation of a second STA related to the wireless medium is performed in the first time interval, the frame for channel access is received from the first STA in the third time interval.

The first to fourth aspects of the present invention may include part or the entirety of elements disclosed below.

The first time interval may be a slot time corresponding to an AID bit set to '1' in the TIM bitmap, and each of the second time intervals may be a slot time corresponding to an AID bit set to '0' in the TIM bitmap.

The third time interval may be a second time interval closest to the first time interval among the second time intervals after the first time interval.

The third time interval may be randomly selected from among the second time intervals.

The method may further include receiving a slot hopping configuration indicator, wherein the third time interval may be determined to be a second time interval closest to the first time interval among the second time intervals after the first time interval or a time interval randomly selected from among the second time intervals.

The operation of the second STA related to the wireless medium may include use of the wireless medium by the second STA or channel access by the second STA.

Channel access by the second STA corresponds to transmission of a frame by one of an STA of an OBSS, a non-cooperative STA, an STA switched from a long sleep state, and an STA associated with an AID not corresponding to the TIM bitmap.

The frame may be one of frames including a power save (PS)-Poll, a null data frame or an uplink data packet.

The attempting may include transmitting a frame for channel access.

A frame for the channel access may be a PS-Poll or a channel access request frame.

Advantageous Effects

According to one embodiment, when channel access is not smoothly performed in an allocated slot in a slotted channel access method, the access may be attempted in a slot time in which the probability of attempt of access by other stations (STAs) is low. Thereby, the probability of success in channel access may be increased.

The effects that can be obtained from the present invention are not limited to the aforementioned effects, and other effects may be clearly understood by those skilled in the art from the descriptions given below.

DESCRIPTION OF DRAWINGS

The accompanying drawings, which are included to provide a further understanding of the invention, illustrate embodiments of the invention and together with the description serve to explain the features of the invention. In the drawings:

FIG. 13 illustrates a hidden node and an exposed node;

FIG. 14 illustrates RTS and CTS;

BEST MODE

Figure 1:
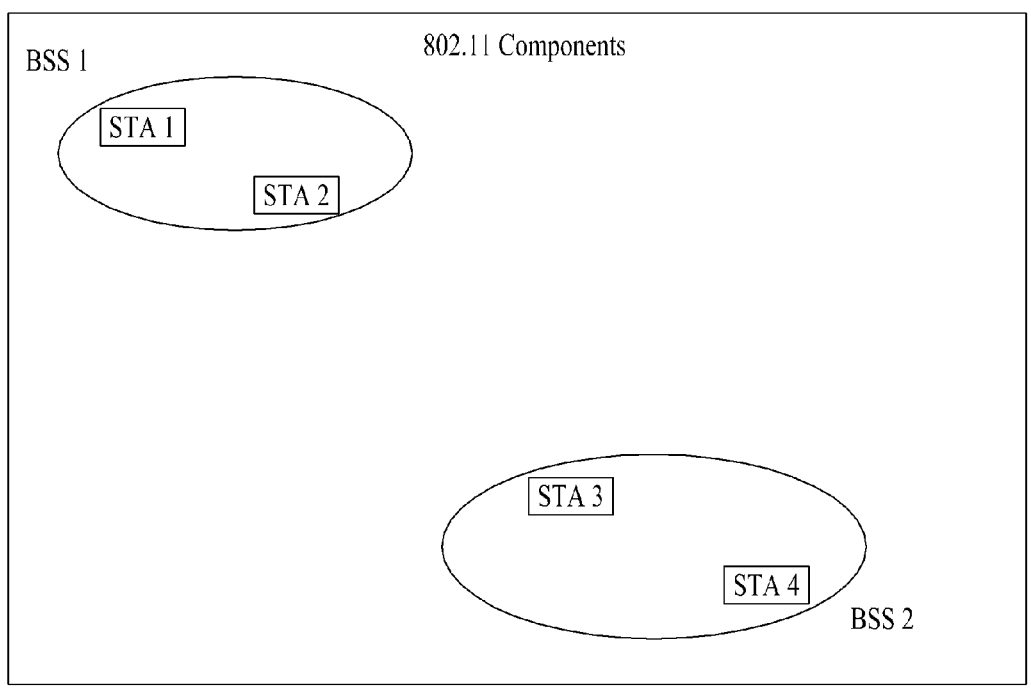
FIG. 1 is a diagram showing an exemplary structure of an IEEE 802.11 system to which the present invention is applicable.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to present only the embodiments that can be implemented according to the invention. The following detailed description includes specific details in order to provide a thorough understanding of the present invention. However, it will be apparent to those skilled in the art that the present invention may be practiced without such specific details.

In some cases, well-known structures and devices are omitted in order to avoid obscuring the concepts of the present invention and important functions of the structures and devices may be mainly illustrated in the form of block diagrams.

Specific terms are employed in the following descriptions for better understanding of the present invention. Such specific terms may take other forms within the technical scope or spirit of the present invention.

Exemplary embodiments of the present invention are supported by standard documents disclosed for at least one of an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system, which are wireless access systems. That is, steps or parts which are not described to clearly reveal the technical spirit of the present invention in the embodiments of the present invention may be supported by the above documents. All terminology used herein may be supported by at least one of the aforementioned documents.

The following embodiments of the present invention can be applied to a variety of wireless access technologies such as, for example, CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier Frequency Division Multiple Access). CDMA may be embodied through a radio technology such as UTRA (Universal Terrestrial Radio Access) or CDMA2000. TDMA may be embodied through radio technologies such as GSM (Global System for Mobile communication)/GPRS (General Packet Radio Service)/EDGE (Enhanced Data Rates for GSM Evolution). OFDMA may be embodied through radio technologies such as IEEE 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution), which is a part of E-UMTS (Evolved UMTS) that uses E-UTRA, employs OFDMA in downlink and SC-FDMA in uplink. LTE-A (LTE-Advanced) is an evolved version of 3GPP LTE.

For clarity, the following description mainly focuses on IEEE 802.11 systems, but technical features of the present invention are not limited thereto.

Generals of the System

FIG. 1 is a diagram showing an exemplary structure of an IEEE 802.11 system to which the present invention is applicable.

The structure of the IEEE 802.11 system may include a plurality of components. A WLAN which supports transparent STA mobility for a higher layer may be provided by interaction between components. A Basic Service Set (BSS) may correspond to a basic component block in an IEEE 802.11 LAN. In FIG. 1, two BSSs (BSS1 and BSS2) are shown and each of the BSSs includes two STAs as members thereof (i.e., STA1 and STA2 are included in BSS 1, and STA3 and STA4 are included in BSS2). In FIG. 1, an ellipse indicating each BSS may be understood as a coverage area in which STAs included in the BSS maintain communication. This area may be referred to as a basic service area (BSA). If an STA moves out of the BSA, the STA cannot directly communicate with the other STAs within the BSA.

In the IEEE 802.11 LAN, the most basic type of BSS is an independent BSS (IBSS). For example, the IBSS may have a minimal form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. This type of LAN may be configured when the LAN is necessary, rather than being prescheduled. This network may be referred to as an ad-hoc network.

Memberships of an STA in a BSS may be dynamically changed depending on whether the STA is switched on or off and whether the STA enters or leaves the BSS area. The STA may use a synchronization process to join the BSS to be a member of the BSS. To access all services of a BSS infrastructure, the STA should be associated with the BSS. Such association may be dynamically set and may involve use of a distribution system service (DSS).

Figure 2:
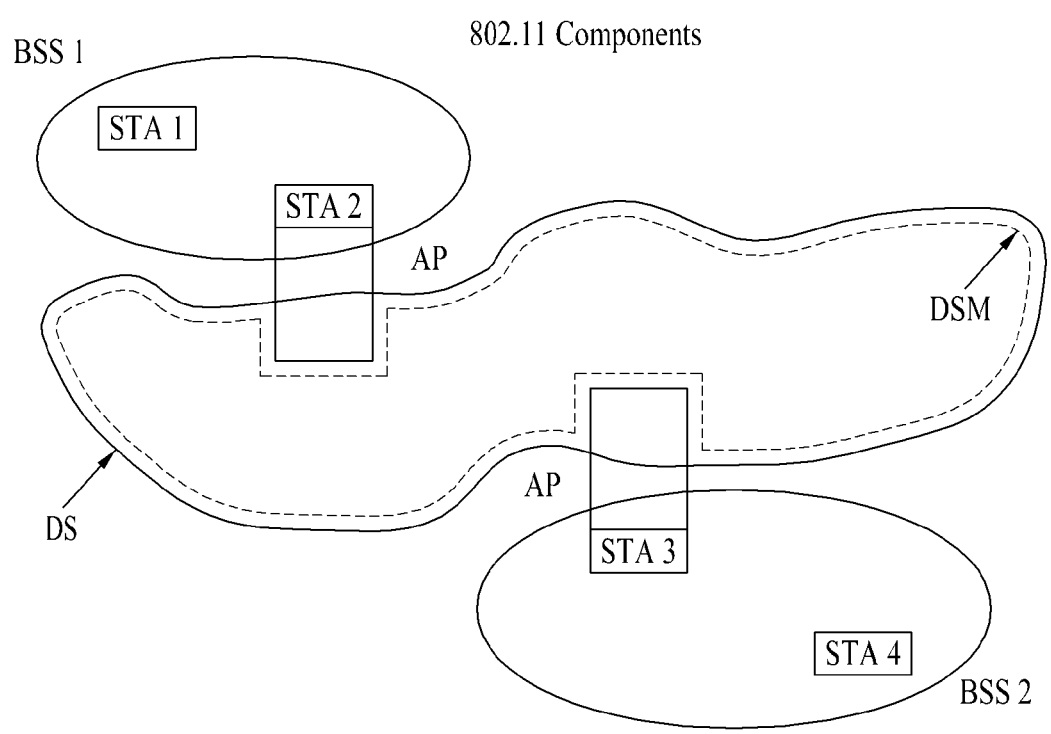
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be limited physical layer (PHY) performance. In some cases, such distance limit may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network including a plurality of BSSs, rather than being independently present as shown in FIG. 1.

The DS is a logical concept and may be specified by the characteristics of the DSM. In this regard, a wireless medium (WM) and the DSM are logically distinguished from each other in IEEE 802.11. Respective logical media are used for different purposes and are used by different components. According to IEEE 802.11, such media are not restricted to either the same or different media. The flexibility of the IEEE 802.11 LAN architecture (DS architecture or other network architectures) can be explained by the fact that plural media are logically different from each other. That is, the IEEE 802.11 LAN architecture can be implemented in various manners and may be independently specified by a physical property of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs basically correspond to STAs, all APs are addressable entities. An address used by an AP for communication on the WM need not be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
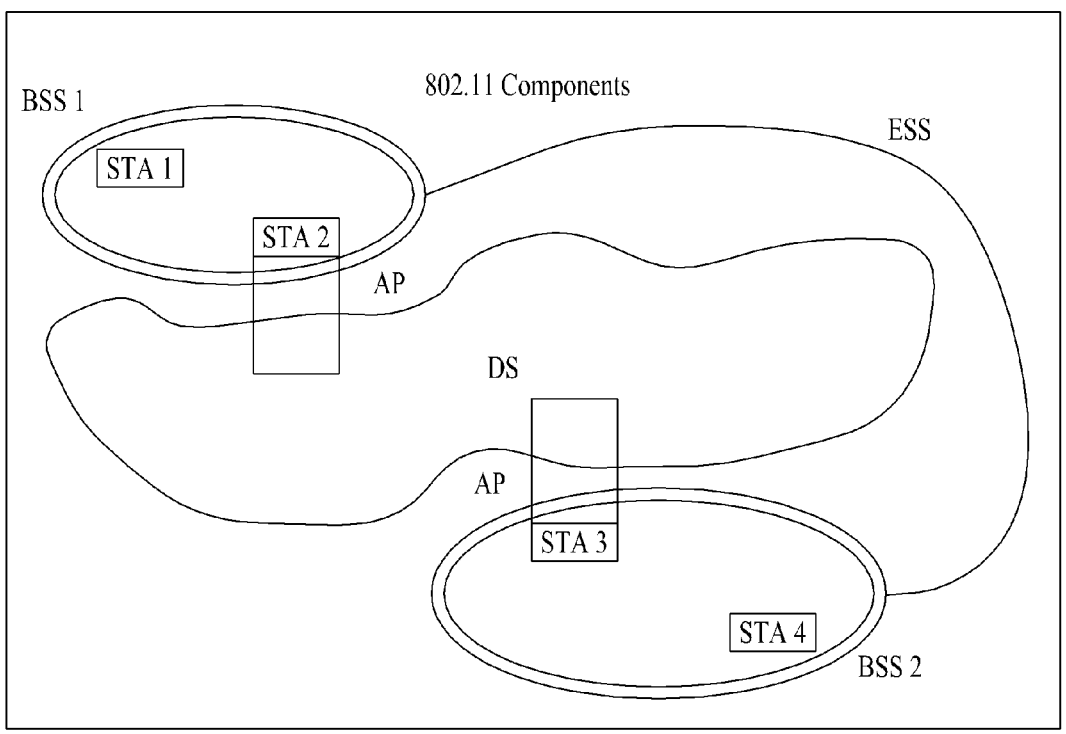
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be constructed by a DS and BSSs. In the IEEE 802.11 system, this type of network is referred to as an ESS network. The ESS may correspond to a set of BSSs connected to one DS. However, the ESS does not include the DS. The ESS network is characterized in that the ESS network is viewed as an IBSS network in a logical link control (LLC) layer. STAs included in the ESS may communicate with each other and mobile STAs are movable transparently from one BSS to another BSS (within the same ESS) in LLC.

In IEEE 802.11, any relative physical locations of the BSSs in FIG. 3 are not assumed and may be arranged in the following forms. BSSs may partially overlap and this positional arrangement is generally used to provide continuous coverage. The BSSs may not be physically connected, and a distance between BSSs logically has no limit. The BSSs may be located at the same physical position and this positional arrangement may be used to provide redundancy. One (or at least one) IBSS or ESS network may be physically present in one space as one (or at least one) ESS network. This may correspond to an ESS network form in the case in which an ad-hoc network operates in a location in which an ESS network is present, in the case in which IEEE 802.11 networks of different organizations physically overlap, or in the case in which two or more different access and security policies are needed in the same location.

Figure 4:
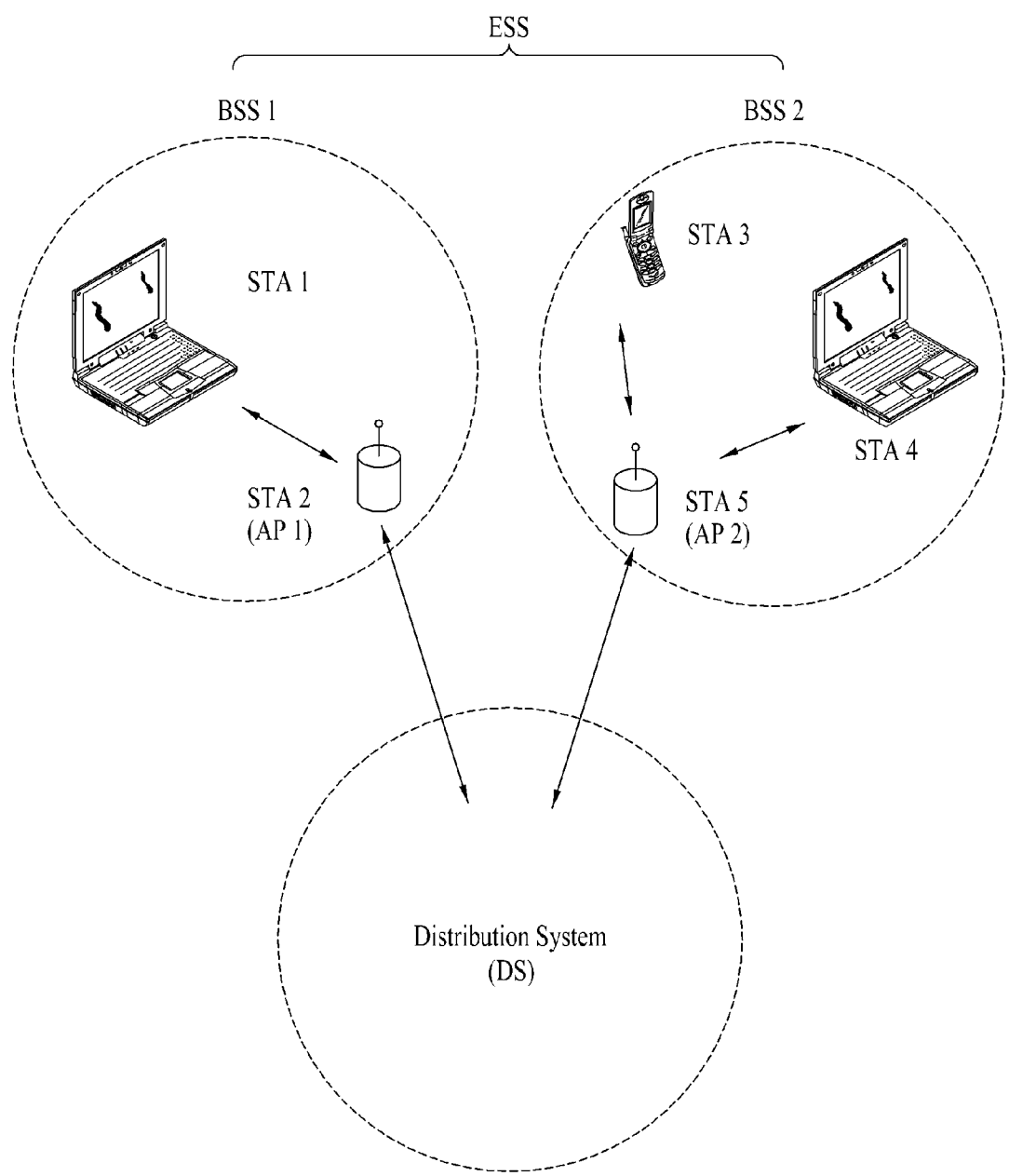
FIG. 4 is a diagram showing an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices such as laptop computers or mobile phones which are generally handled directly by users. In the example of FIG. 4, STA1, STA3, and STA4 correspond to the non-AP STAs and STA2 and STA5 correspond to AP STAs.

In the following description, the non-AP STA may be called a terminal, a wireless transmit/receive unit (WTRU), user equipment (UE), a mobile station (MS), a mobile terminal, or a mobile subscriber station (MSS). The AP is a concept corresponding to a base station (BS), a Node-B, an evolved Node-B (e-NB), a base transceiver system (BTS), or a femto BS in other wireless communication fields.

Figure 5:
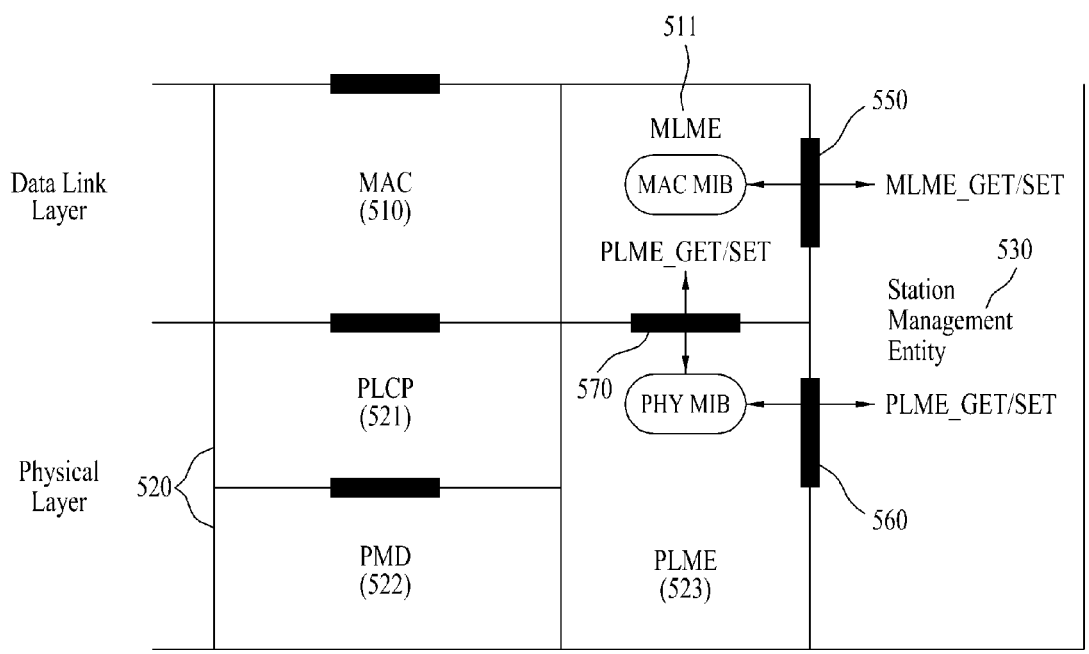
FIG. 5 shows exemplary structures of a data link layer and a physical layer of an IEEE 802.11 system to which the present invention is applicable.

FIG. 5 shows exemplary structures of a data link layer and a physical layer of an IEEE 802.11 system to which the present invention is applicable.

Referring to FIG. 5, the physical layer 520 may include a PLCP (physical layer convergence procedure) entity 521 and a PMD (physical medium dependent) entity 522. The PLCP entity serves to connect a MAC sublayer 510 to a data frame. The PMD entity 522 serves to wirelessly transmit and receive data to/from two or more STAs in the OFDM scheme.

Both the MAC sublayer 510 and physical layer 520 conceptually include management entities, which may be called a MAC sublayer management entity (MLME) 511 and a physical layer management entity (PLME) 521, respectively. These entities 511 and 521 provide layer management service interfaces through the operation of a layer management function.

In order to provide correct MAC operation, a station management entity (SME) 530 is present within each STA. The SME 530 is a layer-independent management entity that collects information about layer-dependent status from the various layer management entities or sets values of layer-specific parameters. The SME 530 may perform such functions on behalf of general system management entities and implement standard management protocols.

The various entities as above interact in various ways. FIG. 5 illustrates some examples of exchanging GET/SET primitives. An XX-GET.request primitive is used to request the value of a management information base (MIB) attribute. The XX-GET.confirm primitive returns the value of the MIB attribute if the status is "SUCCESS," otherwise returning an error indication in the status field. The XX-SET.request primitive is used to request that a designated MIB attribute be set to a given value. If this MIB attribute indicates a specific operation, it requests that a specific operation be performed. If a status is set to "SUCCESS," the XX-SET.confirm primitive indicates that the designated MIB attribute has been set to the requested value. Otherwise, the status field indicates an error. If the MIB attribute indicates a specific operation, this primitive may confirm that the operation is performed.

As shown in FIG. 5, the MLME 511 and the SME 530, and the PLME 523 and the SME 530 may exchange various primitives via an MLME_service access point (MLME_SAP) 550 and a PLME_service access point (PLME_SAP) 560, respectively. In addition, the MLME 511 and the PLME 523 may exchange a primitive via an MLME-PLME_service access point (MLME-PLME_SAP) 570.

Link Setup Process

Figure 6:
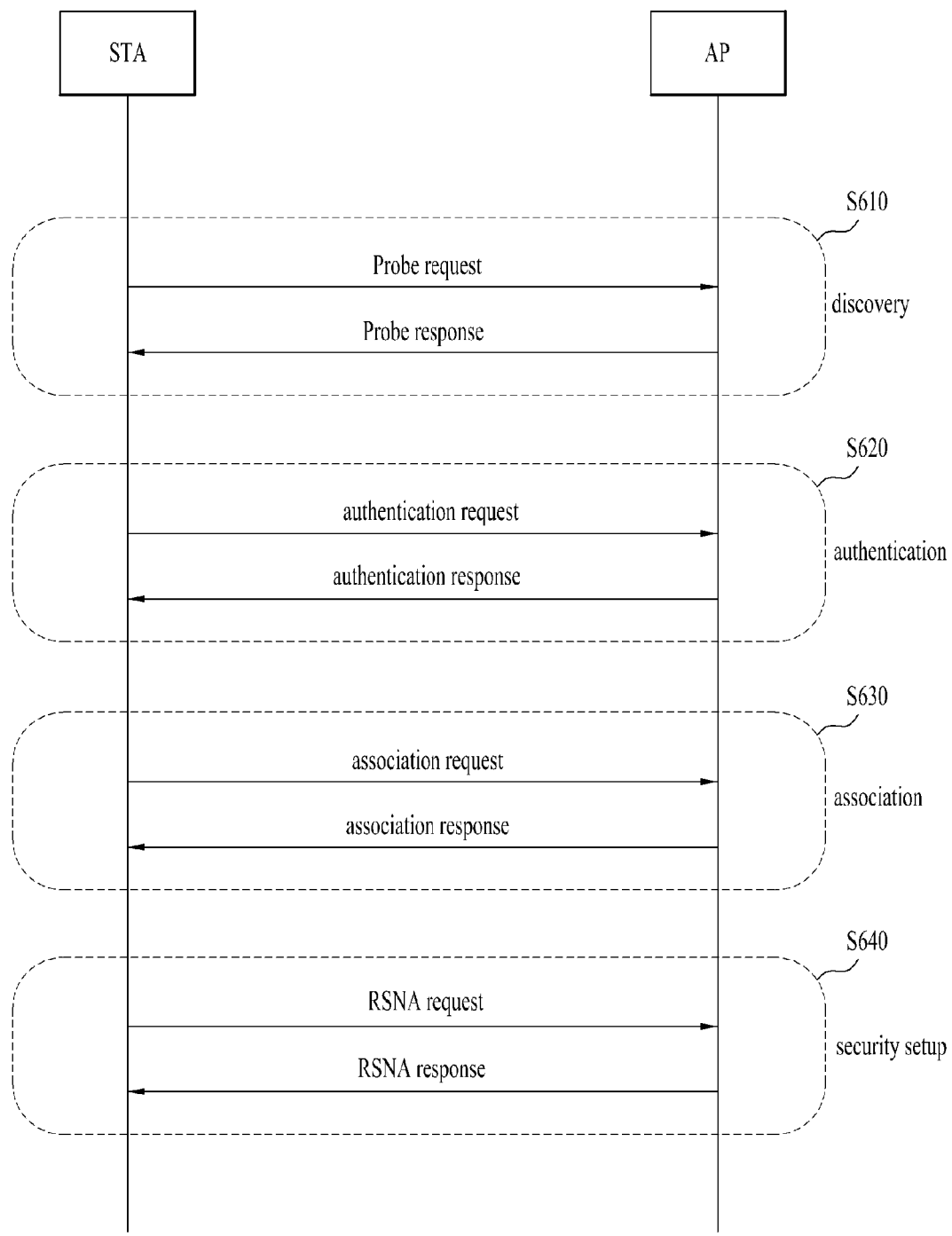
FIG. 6 illustrates a general link setup process in a WLAN system to which the present invention is applicable.

FIG. 6 illustrates a general link setup process in a WLAN system to which the present invention is applicable.

To establish link setup on the network and transmit/receive data over the network, the STA should perform network discovery and authentication, establish association, and perform an authentication procedure for security. The link setup process may also be referred to as a session initiation process or a session setup process. In addition, the discovery, authentication, association, and security setup steps in the link setup process may be collectively called an association step in a general sense.

Hereinafter, an exemplary link setup process will be described with reference to FIG. 6.

In step S610, the STA may perform the network discovery operation. The network discovery operation may include a scanning operation of the STA. That is, the STA needs to search for an available network so as to access the network. The STA needs to identify a compatible network before participating in a wireless network. Herein, the process of identifying the network contained in a specific region is referred to as scanning.

The scanning operation is classified into active scanning and passive scanning.

FIG. 6 exemplarily shows the network discovery operation including the active scanning process. In the case of the active scanning, the STA configured to perform scanning transmits a probe request frame and waits for a response to the probe request frame, in order to move between channels and search for APs present nearby. A responder transmits a probe response frame to the STA having transmitted the probe request frame, in response to the probe request frame. Herein, the responder may be the last STA that has transmitted a beacon frame in a BSS of the scanned channel. In the BSS, since the AP transmits a beacon frame, the AP serves as the responder. In the IBSS, STAs within the IBSS transmit a beacon frame in rotation, and thus the responder is fixed. For example, the STA that has transmitted the probe request frame on Channel #1 and has received the probe response frame on Channel #1 may store BSS-associated information contained in the received probe response frame and move to the next channel (for example, Channel #2) to perform scanning (i.e., transmission/reception of a probe request/response on Channel #2) in the same manner.

Although not shown in FIG. 6, the passive scanning operation may be carried out. In performing the passive scanning operation, an STA to perform scanning waits for a beacon frame by moving from one channel to another channel. The beacon frame, which is one of the management frames in IEEE 802.11, is periodically transmitted to indicate presence of a wireless network and allows the STA performing scanning to search for the wireless network and participate in the wireless network. In a BSS, the AP periodically transmits the beacon frame. In an IBSS, STAs of the IBSS transmit the beacon frame in rotation. If an STA performing scanning receives the beacon frame, the STA stores information about the BSS contained in the beacon frame, and then moves to another channel and records beacon frame information on each channel. The STA having received the beacon frame stores BSS-related information contained in the received beacon frame, moves to the next channel, and then performs scanning in the same manner as above.

In comparison between active scanning and passive scanning, active scanning is more advantageous than passive scanning in terms of delay and power consumption.

After the STA discovers the network, the STA may perform authentication in step S620. This authentication process may be referred to as first authentication, which is clearly distinguished from the security setup operation of step S640, which will be described later.

The authentication process may include transmitting, by the STA, an authentication request frame to an AP and transmitting, by the AP, an authentication response frame to the STA in response to the authentication request frame. The authentication frame used for authentication request/response may correspond to a management frame.

The authentication frame may include information about an authentication algorithm number, an authentication transaction sequence number, a status code, a challenge text, a robust security network (RSN), a finite cyclic group, etc. This information, which is an example of information that may be contained in the authentication request/response frame, may be replaced with other information, or include additional information.

The STA may transmit an authentication request frame to the AP. The AP may determine whether to authenticate the STA on the basis of the information contained in the received authentication request frame. The AP may provide an authentication result to the STA through the authentication response frame.

After the STA is successfully authenticated, the association process may be conducted in step S630. The association process may include the steps of transmitting, by the STA, an association request frame to the AP and transmitting, by the AP, an association response frame to the STA in response.

For example, the association request frame may include information related to various capabilities, a beacon listen interval, a service set identifier (SSID), supported rates, supported channels, RSN, mobility domain, supported operating classes, a traffic indication map (TIM) broadcast request, an interworking service capability, etc.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), mobility domain, a timeout interval (association comeback time), an overlapping BSS scan parameter, a TIM broadcast response, a QoS map, etc.

The aforementioned information, which corresponds to some parts of information which can be contained in the association request/response frame, may be replaced with other information or include additional information.

After the STA is successfully associated with the network, the security setup process may be performed in step S640. The security setup process of step S640 may be referred to as an authentication process based on a robust security network association (RSNA) request/response. The authentication process of step S620 may be referred to as a first authentication process, and the security setup process of Step S640 may be simply referred to as an authentication process.

The security setup process of Step S640 may include, for example, a private key setup process through 4-way handshaking based on an extensible authentication protocol over LAN (EAPOL) frame. In addition, the security setup process may also be performed in another security scheme which is not defined in IEEE 802.11 standards.

Evolution of WLAN

In order to overcome a limit in WLAN communication speed, IEEE 802.11n has recently been established as a communication standard. IEEE 802.11n aims to increase network speed and reliability as well as to extend a coverage region of the wireless network. More specifically, IEEE 802.11n supports a high throughput (HT) of a maximum data processing speed greater than or equal to 540 Mbps, and is based on multiple input and multiple output (MIMO) technology in which multiple antennas are used at both a transmitter and a receiver.

With widespread use of the WLAN technology and diversification of WLAN applications, there has been a need for development a new WLAN system capable of supporting higher HT than a data processing speed supported by IEEE 802.11n. The next generation WLAN system for supporting very high throughput (VHT) is the next version (for example, IEEE 802.11ac) of the IEEE 802.11n WLAN system, and is one of IEEE 802.11 WLAN systems recently proposed to support a data processing speed greater than or equal to 1 Gbps at an MAC service access point (MAC SAP).

In order to efficiently utilize a radio frequency channel, the next generation WLAN system supports a Multi User Multiple Input Multiple Output (MU-MIMO) transmission scheme in which a plurality of STAs can simultaneously access a channel. In accordance with the MU-MIMO transmission scheme, the AP may simultaneously transmit packets to at least one MIMO-paired STA. In addition, a technology for supporting WLAN system operations in whitespace has recently been discussed. For example, a technology for introducing the WLAN system in TV whitespace (TV WS) such as a frequency band (e.g., a band between 54 MHz and 698 MHz) left idle due to transition from analog TV to digital TV has been discussed under the IEEE 802.11af standard. However, this is simply illustrative, and the whitespace may be viewed as a licensed band which is primarily usable by a licensed user. The licensed user means a user who has permission to use the licensed band, and may also be referred to as a licensed device, a primary user, an incumbent user, or the like.

For example, an AP and/or STA operating in the whitespace (WS) should provide a function of protecting the licensed user. For example, in the case in which a licensed user such as a microphone is already using a specific WS channel which is in a frequency band divided according to a regulation so as to have a specific bandwidth in the WS band, the AP and/or STA are not allowed to use the frequency band corresponding to the WS channel in order to protect the licensed user. In addition, the AP and/or STA should stop using a frequency band for transmission and/or reception of a current frame when the licensed user uses this frequency band.

Accordingly, the AP and/or STA needs to pre-check whether use of a specific frequency band within the WS band is possible, namely whether a licensed user is in the frequency band. Checking whether a licensed user is in the specific frequency band is referred to as spectrum sensing. An energy detection scheme, a signature detection scheme and the like are utilized as the spectrum sensing mechanisms. The AP and/or STA may determine that a licensed user is using the specific frequency band if the intensity of a received signal exceeds a predetermined value, or when a DTV preamble is detected.

Machine-to-machine (M2M) communication technology has been discussed as a next generation communication technology. Technical standard IEEE 802.11ah to support M2M communication in the IEEE 802.11 WLAN system is also under development. M2M communication, which represents a communication scheme involving one or more machines, may also be referred to as machine type communication (MTC) or machine-to-machine (M2M) communication. Herein, the machine may represent an entity that does not require direct manipulation from or intervention of a user. For example, not only a meter or vending machine equipped with a wireless communication module, but also user equipment such as a smartphone which is capable of performing communication by automatically accessing the network without manipulation/intervention by the user may be an example of the machines. M2M communication may include device-to-device (D2D) communication and communication between a device and an application server. As an example of communication between a device and an application server, communication between a vending machine and an application server, communication between a Point of Sale (POS) device and an application server, and communication between an electric meter, a gas meter or a water meter and an application server. M2M communication-based applications may include security, transportation and healthcare applications. Considering the characteristics of the aforementioned application examples, M2M communication needs to support occasional transmission/reception of a small amount of data at a low speed in an environment including a large number of devices.

Specifically, M2M communication needs to support a large number of STAs. While the current WLAN system assumes that one AP is associated with up to 2007 STAs, various methods to support other cases in which many more STAs (e.g., about 6000 STAs) are associated with one AP have been discussed regarding M2M communication. In addition, it is expected that there will be many applications to support/require a low transfer rate in M2M communication. In order to smoothly support many STAs, an STA in the WLAN system may recognize presence or absence of data to be transmitted thereto on the basis of a traffic indication map (TIM), and several methods to reduce the bitmap size of the TIM have been under discussion. In addition, it is expected that there will be much traffic data having a very long transmission/reception interval in M2M communication. For example, in M2M communication, a very small amount of data such as electric/gas/water metering is required to be transmitted and received at long intervals (for example, every month). Accordingly, there have been discussions about methods to efficiently support the case in which a very small number of STAs have a data frame to receive from the AP during one beacon period while the number of STAs to be associated with one AP increases in the WLAN system.

As described above, WLAN technology is rapidly evolving, and not only the aforementioned exemplary techniques but also other techniques for direct link setup, improvement of media streaming throughput, support of high-speed and/or large-scale initial session setup, and support of an extended bandwidth and operation frequency are under development.

Frame Structure

Figure 7:
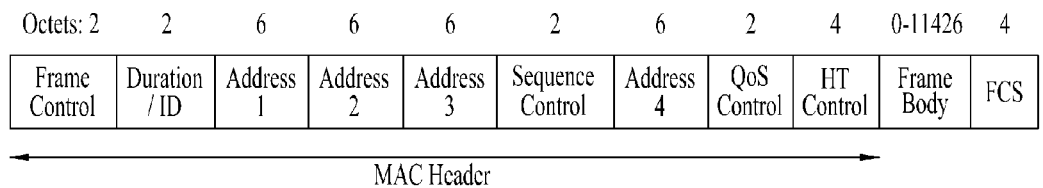
FIG. 7 exemplarily shows a MAC frame format of an IEEE 802.11 system to which the present invention is applicable.

FIG. 7 exemplarily shows a MAC frame format of an IEEE 802.11 system to which the present invention is applicable.

Referring to FIG. 7, a MAC frame format includes a MAC header (MHR), a MAC payload, and a MAC footer (MFR). The MHR includes a frame control field, a duration/ID field, an Address 1 field, an Address 2 field, an Address 3 field, a sequence control field, an Address 4 field, a quality of service (QoS) Control field, and an HT Control field. The Frame Body field, defined by the MAC payload, has data to be transmitted in a higher layer, and has a variable size. The frame check sequence (FCS) field is defined by the MAC footer and is used to search for an error of the MAC frame.

The first three fields (the frame control field, the duration/ID field and the Address 1 field), and the last field (the FCS field) constitute a minimal frame format, and are present in all frames. The other fields may be present only in a specific frame type.

Information contained in each of the aforementioned fields may comply with the definition of the IEEE 802.11 system. In addition, each of the aforementioned fields may be an example of fields which may be included in a MAC frame, and may be replaced with another field or include an additional field.

Figure 8:
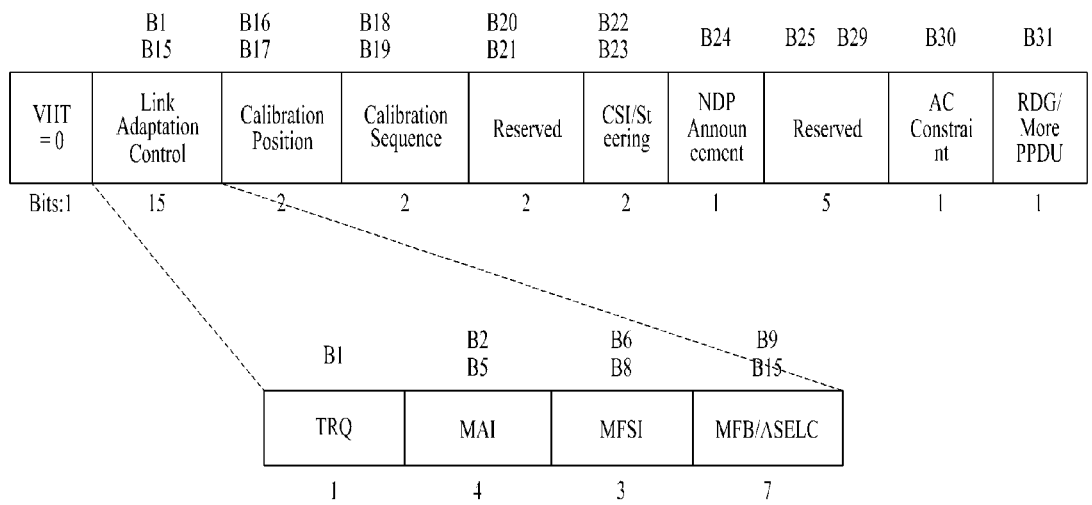
FIG. 8 exemplarily shows an HT format of an HT Control field in the MAC frame of FIG. 7.

FIG. 8 exemplarily shows an HT format of the HT Control field in the MAC frame of FIG. 7.

Referring to FIG. 8, the HT Control field may include a VHT subfield, a Link Adaptation subfield, a Calibration Position subfield, a Calibration Sequence field, a CSI (Channel State Information)/Steering subfield, an NDP (Null Data Packet) Announcement field, an AC (Access Category) Constraint subfield, and an RDG (Reverse Direction Grant)/More PPDU subfield, and a Reserved subfield.

The Link Adaptation subfield may include a TRQ (Training Request) subfield, an MAI (MCS (Modulation and Coding Scheme) Request or ASEL (Antenna Selection) Indication) subfield, an MFSI (MCS Feedback Sequence Identifier) subfield, and an MFB/ASELC (MCS Feedback and Antenna Selection Command/data) subfield.

The TRQ subfield is set to 1 when a request for transmission of a sounding PPDU is made to a responder, and is set to 0 when a request for transmission of the sounding PPDU is not made to the responder. When the MAI subfield is set to 14, it represents ASEL indication, and the MFB/ASELC subfield is interpreted as the antenna selection command/data. Otherwise, the MAI subfield represents an MCS request, and the MFB/ASELC subfield is interpreted as the MCS feedback. In the case in which the MAI subfield represents the MCS request (MRQ), the subfield is set to 0 when no MCS feedback is requested and is set to 1 when an MCS feedback is requested. The sounding PPDU, which may be used for channel estimation, represents a PPDU for transmitting a training symbol.

Each of the aforementioned subfields, which are examples of subfields that can be included in the HT Control field, may be replaced with another subfield or include an additional subfield.

Figure 9:
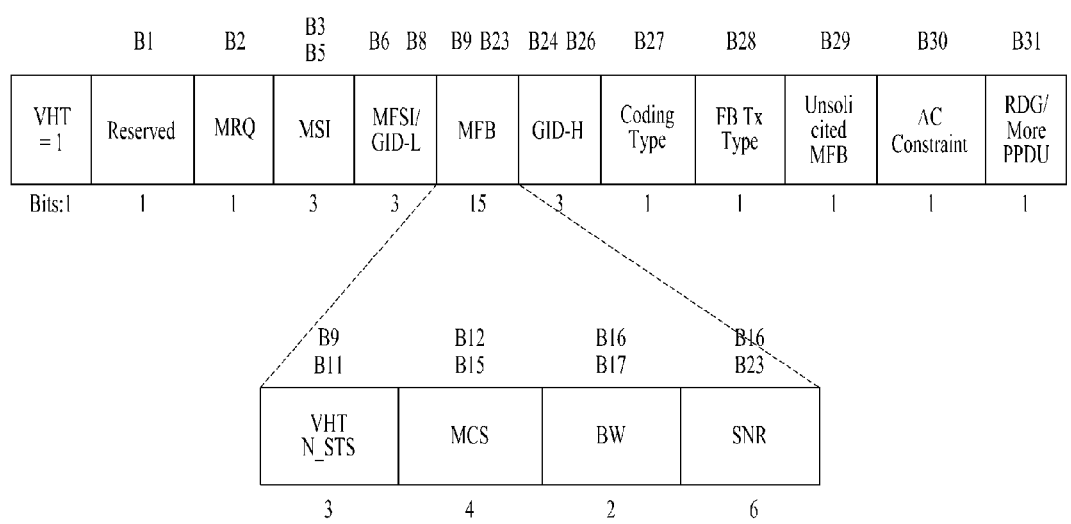
FIG. 9 exemplarily shows a VHT format of the HT Control field in the MAC frame of FIG. 7.

FIG. 9 exemplarily shows a VHT format of the HT Control field in the MAC frame of FIG. 7.

Referring to FIG. 9, the HT Control field may include a VHT subfield, an MRQ subfield, an MSI subfield, an MFSI/GID-L (MCS Feedback Sequence Indication/LSB of Group ID) subfield, an MFB subfield, a GID-H (MSB of Group ID) subfield, a Coding Type subfield, an FB Tx Type (Transmission type of MFB response) subfield, an Unsolicited MFB subfield, an AC Constraint subfield, and an RDG/More PPDU subfield. In addition, the MFB subfield may include a VHT N_STS (Number of Space Time Streams) subfield, MCS subfield, a BW (Bandwidth) subfield, and an SNR (Signal to Noise Ratio) subfield.

Table 1 provides descriptions of the subfields in the VHT format of the HT Control field.

TABLE 1

| Subfield | Meaning | Definition |
| --- | --- | --- |
| MRQ | MCS request | Set to 1 when the MCS feedback(solicited MFB) is requested. Otherwise, set to 0. |
| MSI | MRQ sequence identifier | When the MRQ subfield is set to 1, the MSI subfield includes a sequence number for identifying a specific request between 0 and 6. If the MRQ subfield is set to 0, the MSI subfield is reserved. |

TABLE 1-continued

| Subfield | Meaning | Definition |
| --- | --- | --- |
| MFSI/GID-L | MFB sequence identifier/LSB of Group ID | If the unsolicited MFB subfield is set to 0, the MFSI/GID-L subfield includes a received value of the MSI included in a frame indicated by the MFB information. If the unsolicited MFB subfield is set to 1, the MFSI/GID-L subfield includes three least significant bits of Group ID of the PPDU indicated by the unsolicited MFB. |
| MFB | VHT N_STS, MCS, BW, SNR feedback | The MFB subfield includes a recommended MFB. If MCS = 15 and VHT N_STS = 7, this indicates that feedback is not present. |
| GID-H | MSB of Group ID | If the unsolicited MFB subfield is set to 1, the GID-H subfield includes three most significant bits of Group ID of the PPDU indicated by the unsolicited MFB. |
| Coding Type | Coding type of MFB response | If the unsolicited MFB subfield is set to 1, the Coding Type subfield contains coding information (1 for a binary convolutional code (BCC) and 0 for a low-density parity check (LDPC)) indicated by the unsolicited MFB. Otherwise, it is reserved. |
| FB Tx Type | Transmission type of MFB response | If the unsolicited MFB subfield is set to 1, and the FB Tx Type subfield is set to 0, the unsolicited MFB indicates one of transmission diversities using an unbeamformed VHT PPDU or an STBC (space-time block coding) VHT PPDU. If unsolicited MFB subfield is set to 1, and the FB Tx Type subfield is set to 1, the unsolicited MFB indicates the beamformed SU-MIMO (Single User MIMO) VHT PPDU. Otherwise, it is reserved. |
| Unsolicited MFB | Unsolicited MCS feedback indicator | If the MFB is not a response to the MRQ, this subfield is set to 1. If the MFB is a response to the MRQ, this subfield is set to 0. |
| AC Constraint | | If a response to the RDG includes a data frame from a certain traffic identifier (TID), this subfield is set to 0. If the response to the RDG includes only a frame from the same AC as that of the last data frame received from the same reverse direction (RD) initiator, this subfield is set to 1. |
| RDG/More PPDU | | The RDG/More PPDU subfield set to 0 indicates that there is no RDG if the RD initiator is transmitted, and indicates that the PPDU transmitting the MAC frame is the final transmission if an RD responder is transmitted. The RDG/More PPDU subfield set to 1 indicates that there is an RDG if the RD initiator is transmitted, and indicates that another PPDU follows the PPDU transmitting the MAC frame, if the responder is transmitted. |

Each of the aforementioned subfields, which are examples of subfields that can be included in the HT Control field, may be replaced with another subfield or include an additional subfield.

Meanwhile, the MAC sublayer transfers a MAC protocol data unit (MPDU) to a physical layer (PHY) as a PHY service data unit (PSDU). The PLCP entity adds a PHY header and a preamble to the received PSDU to create a PLCP protocol data unit (PPDU).

Figure 10:
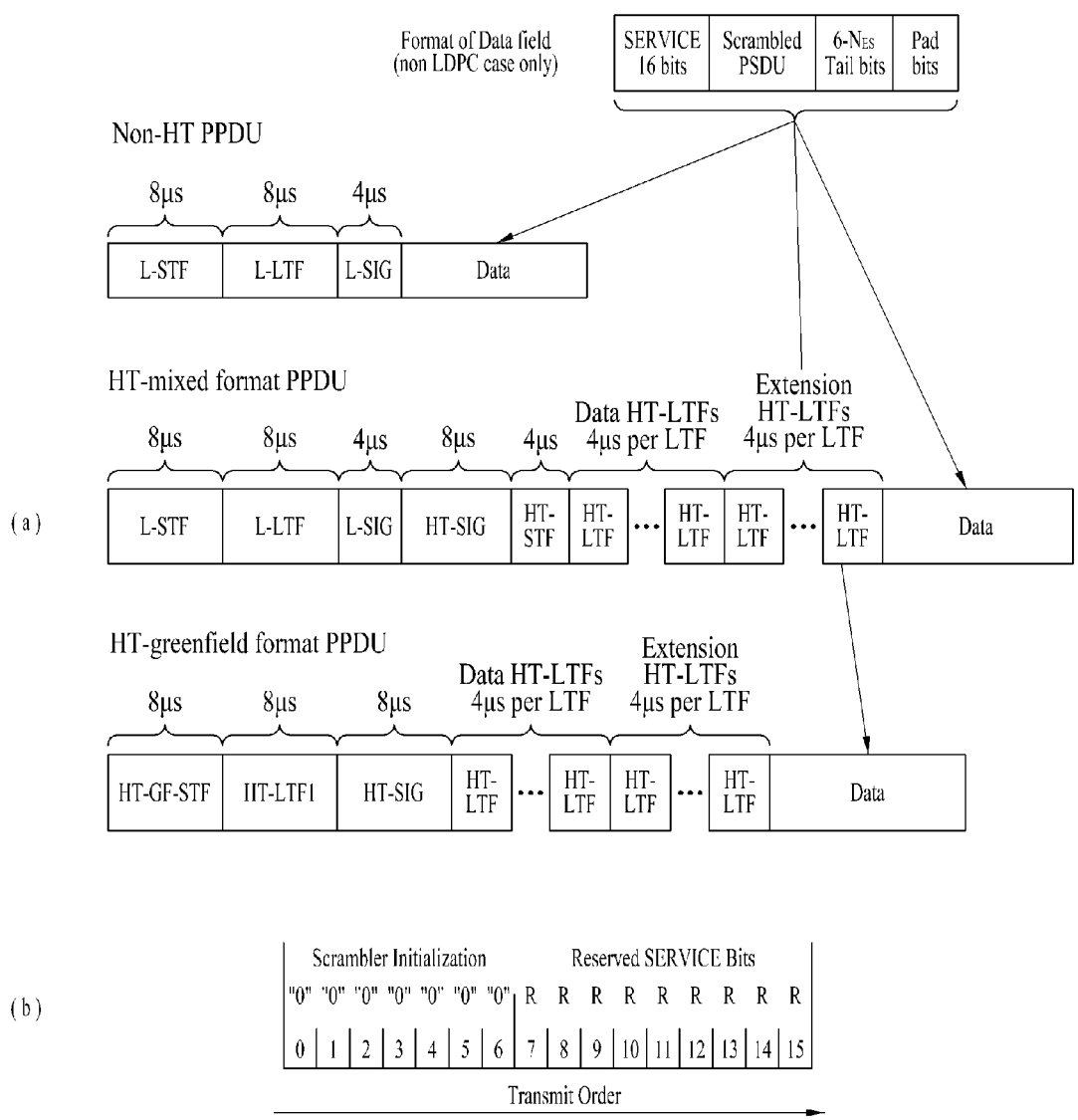
FIG. 10 exemplarily shows PPDU frame formats of an IEEE 802.11n system to which the present invention is applicable.

FIG. 10 exemplarily shows PPDU frame formats of an IEEE 802.11n system to which the present invention is applicable.

FIG. 10(a) exemplarily shows PPDU frames according to a Non-HT format, an HT-mixed format, and an HT-greenfield format.

The Non-HT format represents a frame format for STAs of a conventional legacy system (IEEE 802.11 a/g). A Non-HT format PPDU includes a legacy format preamble configured with an L-STF (Legacy-Short Training field), an L-LTF (Legacy-Long Training field), and an L-SIG (Legacy-Signal) field.

The HT-mixed format allows STAs of a conventional legacy system to perform communication, and at the same time represents a frame format for STAs of IEEE 802.11n. An HT-mixed format PPDU includes a legacy format preamble including an L-STF, an L-LTF and an L-SIG, and an HT format preamble including an HT-short training field (HT-STF), an HT-long training field (HT-LTF) and an HT-signal (HT-SIG) field. Since the L-STF, L-LTF and L-SIG represent legacy fields for backward compatibility, the L-STF, L-LTF and L-SIG are identical to those of the Non-HT format, and an STA may recognize the mixed format PPDU based on the HT-SIG field following these fields.

The HT-Greenfield format, which is not compatible with the conventional legacy system, represents a frame format for STAs of IEEE 802.11n. The HT-greenfield format PPDU includes a Greenfield preamble configured with an HT-GF-STF (HT-Greenfield-STF), an HT-LTF1, an HT-SIG, and at least one HT-LTF.

The Data field includes a SERVICE field, a PSDU, tail bits, and pad bits. All the bits of the Data field are scrambled.

FIG. 10(*b*) shows the SERVICE field included in the Data field. The Service field has 16 bits. Numbers from 0 to 15 are assigned to the bits respectively, and the bits are sequentially transmitted from bit #0. The bits from bit #0 to bit #6 are set to 0 and used to synchronize the descrambler in the receiver.

Figure 11:
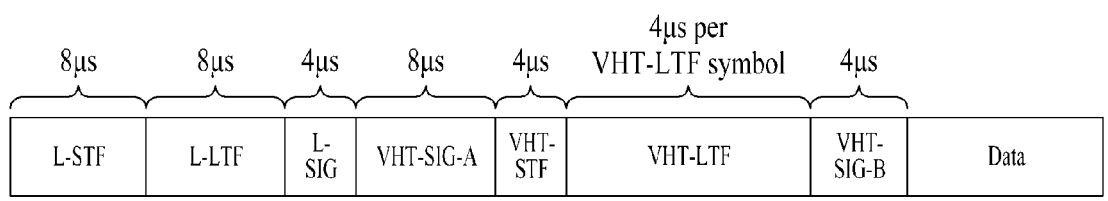
FIG. 11 exemplarily shows a VHT PPDU frame format of an IEEE 802.11ac system to which the present invention is applicable.

FIG. 11 exemplarily shows a VHT PPDU frame format of an IEEE 802.11ac system to which the present invention is applicable.

Referring to FIG. 11, a VHT format PPDU includes a legacy format preamble, which is ahead of the Data field and includes an L-STF, an L-LTF, and L-SIG, and a VHT format preamble, which includes a VHT-SIG-A, an HT-STF and an HT-LTF. Since the L-STF, L-LTF and L-SIG represent legacy fields for backward compatibility, the fields from the L-STF to the L-SIG are identical to those of the Non-HT format, and an STA may identify the VHT format PPDU using the VHT-SIG field subsequent to these fields.

The L-STF is a field for frame detection, auto gain control (AGC), diversity detection, coarse frequency/time synchronization, and the like. The L-LTF is a field for fine frequency/time synchronization, channel estimation, and the like. The L-SIG is a field for transmission of legacy control information. The VHT-SIG-A is a VHT field for transmission of control information shared by the VHT STAs. The VHT-STF is a field for AGC for MIMO and beamformed streams. The VHT-LTF is a field for channel estimation for MIMO and beamformed streams. The VHT-SIG-B is a field for transmission of STA-specified control information.

Medium Access Mechanism

In the IEEE 802.11-based WLAN system, a basic access mechanism of medium access control (MAC) is a Carrier Sense Multiple Access with Collision Avoidance (CSMA/CA) mechanism. The CSMA/CA mechanism, which is also called a Distributed Coordination Function (DCF) of IEEE 802.11 MAC, basically employs a "listen before talk" access mechanism. In accordance with this access mechanism, the AP and/or STA may perform Clear Channel Assessment (CCA) of sensing a radio frequency channel or medium in a predetermined time interval (e.g., DCF Inter-Frame Space (DIFS), prior to data transmission. When it is determined in the sensing that the medium is in the idle state, frame transmission begins through the medium. On the other hand, when it is sensed that the medium is in the occupied state, the AP and/or STA does not start transmission, but establishes a delay time (e.g., a random backoff period) for medium access, and attempts to perform frame transmission after waiting during the period. Through application of a random backoff period, it is expected that multiple STAs will attempt to start frame transmission after waiting for different times, resulting in minimized collision.

In addition, the IEEE 802.11 MAC protocol provides a hybrid coordination function (HCF). HCF is based on the DCF and the point coordination function (PCF). PCF refers to a polling-based synchronous access scheme in which polling is periodically executed to allow all reception APs and/or STAs to receive a data frame. In addition, the HCF includes enhanced distributed channel access (EDCA) and HCF controlled channel access (HCCA). EDCA is achieved when the access scheme provided to multiple users by a provider is based on contention. HCCA is achieved in the contention-free channel access scheme which employs the polling mechanism. In addition, the HCF includes a medium access mechanism for improving Quality of Service (QoS) of the WLAN, and may transmit QoS data during both the contention period (CP) and the contention free period (CFP).

Figure 12:
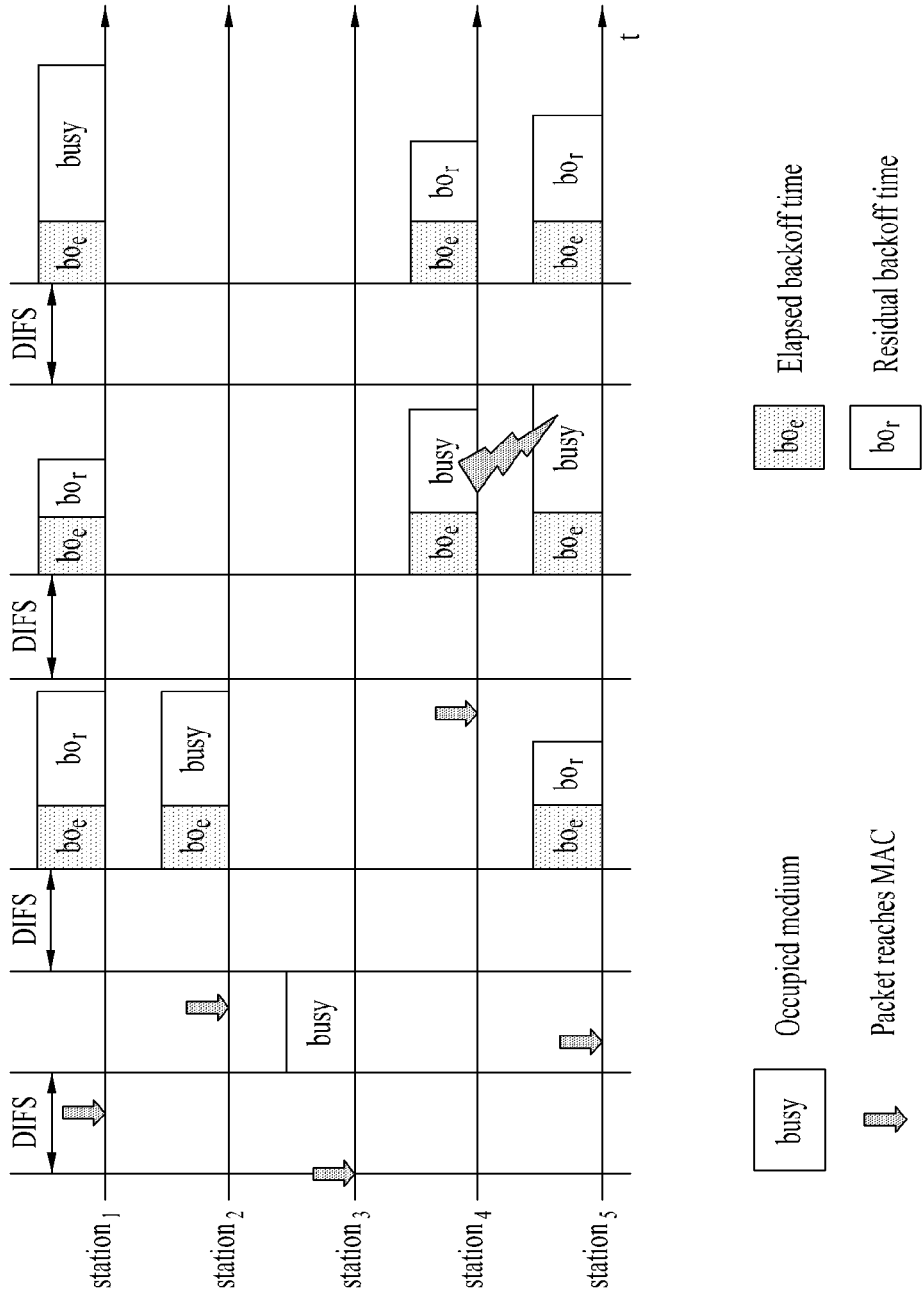
FIG. 12 illustrates a backoff process in a WLAN system to which the present invention is applicable.

FIG. 12 illustrates a backoff process in a WLAN system to which the present invention is applicable.

Operations based on a random backoff period will be described below with reference to FIG. 12.

If the medium is switched from the occupied or busy state to the idle state, several STAs may attempt to transmit data (or frames). In a method to minimize collisions, each STA selects a random backoff count, waits for a slot time corresponding to the selected backoff count, and then attempts to start transmission. The random backoff count has a value of a pseudo-random integer, and may be set to a value in a range between 0 and CW. Herein, CW is a contention window parameter value. Although the CW parameter is given CWmin as the initial value, the initial value may be doubled if transmission fails (for example, if ACK of the transmission frame is not received). If the CW parameter value is CWmax, CWmax is maintained until data transmission is successful, and at the same time data transmission may be attempted. If data transmission is successful, the CW parameter value is reset to CWmin. Preferably, the values of CW, CWmin, and CWmax are set to $2n-1$ (where $n=0, 1, 2, \ldots$).

Once the random backoff process begins, the STA continuously monitors the medium while counting down the backoff slot according to a determined backoff count value. If the medium is monitored as being in the occupied state, the STA stops the countdown and waits for a predetermined time. If the medium is in the idle state, the remaining countdown restarts.

In the example shown in FIG. 12, if a packet for STA3 to transmit reaches MAC of STA3, the STA3 may confirm that the medium is in the idle state in the DIFS and immediately transmit a frame. In the meantime, the remaining STAs monitor the busy state of the medium, and operate in the standby mode. During operation of STA3, each of STA1, STA2, and STA5 may have data to be transmitted. If the idle state of the medium is monitored, each of STA1, STA2, and STA5 waits for the DIFS time and then performs countdown of the backoff slot according to a random backoff count value which they have selected. In the example shown in FIG. 12, STA2 selects the least backoff count value and STA1 selects the greatest backoff count value. That is, when the STA2 starts data transmission after completing backoff counting, the residual backoff time of STA5 is shorter than the residual backoff time of STA1. Each of STA1 and STA5 temporarily stops countdown and waits while STA2 occupies the medium. When occupancy by the STA2 is terminated and the medium returns to the idle state, each of STA1 and STA5 waits for a predetermined DIFS time, and restarts backoff counting. That is, after the residual backoff slot as long as the residual backoff time is counted down, frame transmission may start. Since the residual backoff time of STA5 is shorter than that of STA1, STA5 starts frame transmission. Meanwhile, STA4 may be given data to be transmitted while STA2 occupies the medium. In this case, when the medium is in the idle state, STA4 may wait for the DIFS time, perform countdown according to the random backoff count value selected by the STA4, and then start frame transmission. FIG. 12 exemplarily illustrates a case in which the residual backoff time of STA5 is equal to the random backoff count value of STA4 by chance. In this case, collision may occur between STA4 and STA5. If collision occurs between STA4 and STA5, none of STA4 and STA5 receives ACK, and accordingly data transmission fails. In this case, each of STA4 and STA5 may double the CW value, select a random backoff count value and then perform countdown. Meanwhile, STA1 waits while the medium is in the occupied state due to transmission operation by STA4 and STA5. In this case, when the medium returns to the idle state, STA1 waits for the DIFS time, and then starts frame transmission after lapse of the residual backoff time.

Sensing Operation of STAs

As described above, the CSMA/CA mechanism includes not only a physical carrier sensing through which the AP and/or STA directly sense the medium, but also virtual carrier sensing. The virtual carrier sensing is performed to address some problems (such as a hidden node problem) encountered in the medium access. In the virtual carrier sensing, MAC of the WLAN system may use a network allocation vector (NAV). By means of the NAV value, the AP and/or STA which is using the medium or has authority to use the medium indicates, for another AP and/or another STA, the remaining time until the medium becomes available. Accordingly, the NAV value may correspond to a reserved period during which the medium is used by the AP and/or STA to transmit a frame. An STA having received the NAV value may be prohibited from medium access during the corresponding period. For example, NAV may be set according to the value of the duration field in the MAC header of a frame.

A robust collision detection mechanism has been introduced to reduce the probability of such collision. Hereinafter, this mechanism will be described with reference to FIGS. 13 and 14. The actual carrier sensing range may not be identical to the transmission range, but for simplicity of description, it will be assumed that the actual carrier sensing range is identical to the transmission range.

FIG. 13 illustrates a hidden node and an exposed node.

FIG. 13(a) exemplarily shows a hidden node. In FIG. 13(a), STA A communicates with STA B, and STA C has information to be transmitted. Specifically, STA C may determine that the medium is in the idle state in performing carrier sensing prior to transmission of data to STA B, even in a situation in which STA A is transmitting information to STA B. This is because transmission by STA A (i.e., occupied medium) may not be sensed at the location of STA C. In this case, collision may occur since STA B receives information of STA A and information of STA C simultaneously. In this case, STA A may be considered a hidden node of STA C.

FIG. 13(b) exemplarily shows an exposed node. In FIG. 13(b), STA C has information to be transmitted to STA D in a situation in which STA B is transmitting data to STA A. In this case, STA C may perform carrier sensing and determine that the medium is occupied due to transmission of STA B. Therefore, although STA C has information to be transmitted to STA D, STA C should wait until the medium returns to the idle state since the occupied state of the medium is sensed. However, since STA A is actually located out of the transmission range of STA C, transmission from STA C may not collide with transmission from STA B in view of STA A, and STA C is unnecessarily waiting until STA B stops transmission. In this case, STA C may be viewed as an exposed node of STA B.

FIG. 14 illustrates RTS and CTS.

In order to efficiently utilize the collision avoidance mechanism in an exemplary situation as shown in FIG. 13, short signaling packets such as RTS (request to send) and CTS (clear to send) may be used. RTS/CTS between two STAs may be overheard by nearby STA(s), such that the nearby STA(s) may consider whether information is communicated between the two STAs. For example, if an STA to transmit data transmits an RTS frame to another STA to receive data, the STA to receive data may transmit the CTS frame to nearby STAs, thereby informing the nearby STAs that the STA is about to receive data.

FIG. 14(a) exemplarily shows a method to solve the hidden node problem. The method assumes a situation in which both STA A and STA C attempt to transmit data to STA B. If STA A transmits RTS to STA B, STA B transmits CTS to both STA A and STA C located around STA B. As a result, STA C waits until STA A and STA B stop data transmission, and thus collision is avoided.

FIG. 14(b) exemplarily shows a method to solve the exposed node problem. STA C may overhear RTS/CTS transmission between STA A and STA B, thereby determining that no collision will occur when it transmits data to another STA (e.g., STA D). That is, STA B may transmit RTS to all the nearby STAs, and transmits CTS only to STA A which actually has data to transmit. Since STA C receives only the RTS, but fails to receive the CTS of STA A, STA C may recognize that STA A is located out of the carrier sensing range of STA C.

Inter-Frame Space (IFS)

A time gap between two frames is defined as an inter-frame space (IFS). The ST determines, through carrier sensing, whether a channel is used in the IFS. The DCF MAC layer defines four IFS s. Thereby, priorities for occupancy of a WM are determined.

Each of the IFSs is set to a specific value according to a PHY, regardless of the bit rates of the STAs. The IFSs include a short IFS (SIFS), a PCF IFS (PIFS), a DCF IFS (DIFS), and an extended IFS (EIFS). The short IFS (SIFS) is used in transmitting RTS/CTS and an ACK frame, and has the highest priority. The PCF IFS (PIFS) is used in transmitting the PCF frame, and the DCF IFS (DIFS) is used in transmitting the DCF frame. The extended IFS (EIFS) is used only when an error occurs in frame transmission and the length thereof is not fixed.

Figure 15:
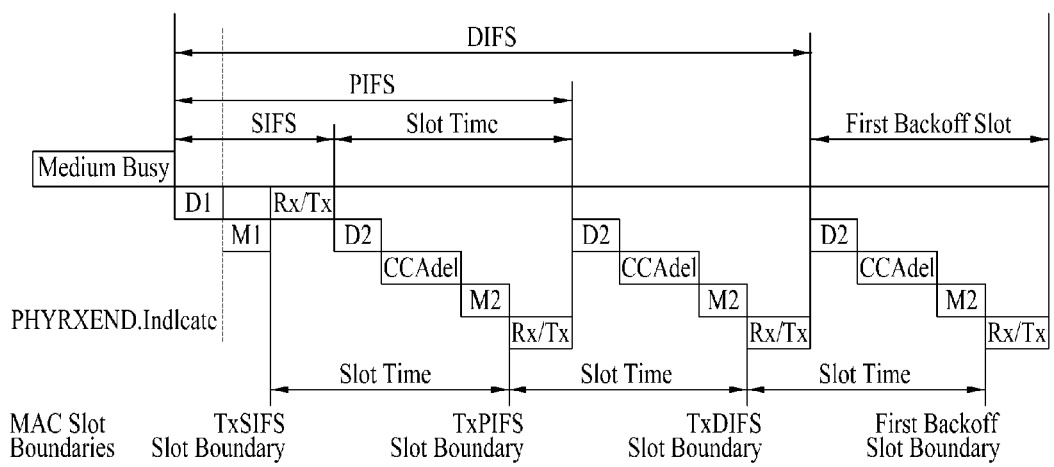
FIG. 15 illustrates an exemplary relationship between IFSs.

The relationship between IFSs is defined by a time gap on the medium, and relevant attributes are provided by PHYs as shown in FIG. 15.

FIG. 15 illustrates an exemplary relationship between IFSs.

In the entire medium timing, the termination time point of the last symbol of a PPDU indicates termination of transmission, and the first symbol of the preamble of the next PPDU indicates start of transmission. The entire timing may be set with reference to the PHY-TXEND.confirm primitive, PHYTXSTART.confirm primitive, PHY-RXSTART.indication primitive and PHY-RXEND.indication primitive.

Referring to FIG. 15, the SIFS time (aSIFSTime) and the slot time (aSlotTime) may be determined for the respective PHYs. The SIFS time may have a fixed value, and the slot time may dynamically change according to change of the wireless delay time (aAirPropagationTime). The SIFS time and slot time are respectively defined as Equations 1 and 2 given below.

$$aSIFSTime = aRxRFDelay + aRxPLCPDelay + aMACProcessingDelay + aRxTxTurnaroundTime \quad \text{Equation 1}$$

$$aSlotTime = aCCATime + aRxTxTurnaroundTime + aAirPropagationTime + aMACProcessingDelay \quad \text{Equation 2}$$

PIFS and SIFS are respectively defined as Equation 3 and 4 given below.

$$PIFS = aSIFSTime + aSlotTime \quad \text{Equation 3}$$

$$DIFS = aSIFSTime + 2*aSlotTime \quad \text{Equation 4}$$

EIFS is calculated from SIFS, DIFS and ACK transmission time (ACKTxTime) as in Equation 5 below. ACK transmission time (ACKTxTime) is expressed in microseconds and has a value necessary for transmission of an ACK frame containing a preamble, a PLCP header and additional PHY-dependent information at the lowest PHY mandatory rate.

$$\text{EIFS} = \text{aSIFSTime} + \text{DIFS} + \text{ACKTxTime} \quad \text{Equation 5}$$

In the example shown in FIG. 15, SIFS, PIFS and DIFS are measured on different MAC slot boundaries (TxSIFS, TxPIFS, TxDIFS) of the medium. A slot boundary is defined as the time at which the transmitter is turned on by the MAC layer to match different IFS timings on the medium after detection of a CCA result at the previous slot time. The MAC slot boundaries for SIFS, PIFS and DIFS are defined by Equations 6 to 8 given below.

$$\text{TxSIFS} = \text{SIFS} - \text{aRxTxTurnaroundTime} \quad \text{Equation 6}$$

$$\text{TxPIFS} = \text{TxSIFS} + \text{aSlotTime} \quad \text{Equation 7}$$

$$\text{TxDIFS} = \text{TxSIFS} + 2 * \text{aSlotTime} \quad \text{Equation 8}$$

Power Management

As described above, STAs in the WLAN system should perform channel sensing before they perform transmission/reception operation. Persistently performing channel sensing causes persistent power consumption of the STA. There is not much difference in power consumption between the reception state and the transmission state, and continuous maintenance of the reception state may cause large load to the STAs provided with limited power (i.e., operated by a battery). Therefore, if an STA maintains the reception standby mode so as to persistently sense the channel, power is inefficiently consumed without special advantages in terms of WLAN throughput. To address this problem, the WLAN system supports a power management (PM) mode of the STA.

The PM mode of the STA is classified into an active mode and a power save (PS) mode. The STA is basically operated in the active mode. The STA operating in the active mode maintains an awake state. When the STA is in the awake state, the STA may normally perform frame transmission/reception, channel scanning, or the like. On the other hand, the STA in the PS mode operates by being switched between the sleep state and the awake state. The STA in the sleep state operates with minimum power and does not perform either frame transmission/reception or channel scanning.

As the time for which the STA operates in the sleep state increases, the amount of power consumption of the STA is reduced, and accordingly the STA operation period increases. However, since transmission or reception of the frame is not allowed in the sleep state, the STA cannot operate unconditionally in the sleep state for a long time. When the STA operating in the sleep state is given a frame to be transmitted to the AP, it may be switched to the awake state to transmit/receive the frame. On the other hand, when the AP has a frame to transmit to the STA which is in sleep-state, the STA cannot receive the frame. Nor can the STA recognize presence of the frame. Accordingly, in order to recognize presence or absence of a frame to be transmitted to the STA (or in order to receive the frame if the frame is present), the STA may need to be switched to the awake state according to a specific period.

Figure 16:
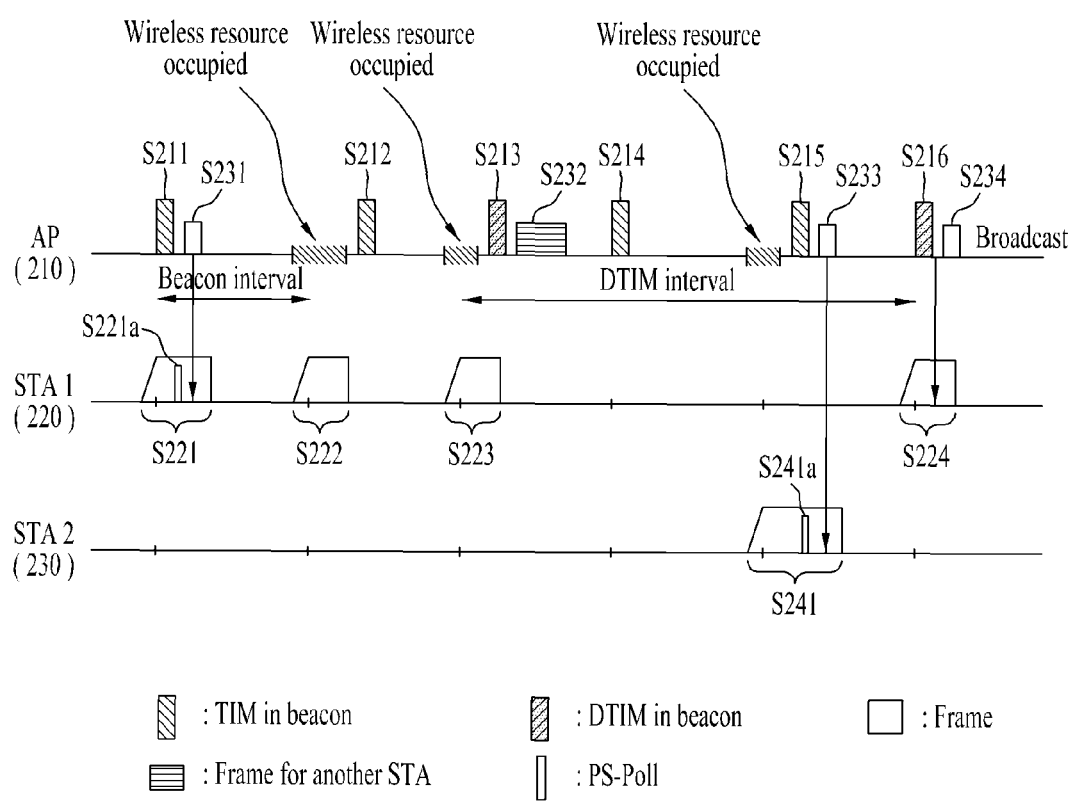
FIG. 16 illustrates a power management operation.

FIG. 16 illustrates a power management operation.

Referring to FIG. 16, AP 210 transmits a beacon frame to STAs present in the BSS at predetermined time intervals (S211, S212, S213, S214, S215 and S216). The beacon frame includes a traffic indication map (TIM) information element. The TIM information element contains information indicating that the AP 210 has buffered traffic for the STAs associated with the AP 210 and that a frame will be transmitted. The TIM element includes a TIM used to inform of a unicast frame and a delivery traffic indication map (DTIM) used to inform of a multicast or broadcast frame.

AP 210 may transmit a DTIM once per three transmissions of the beacon frame.

STA1 220 and STA2 222 are operating in the PS mode. Each of STA1 220 and STA2 222 may be set to be switched from the sleep state to the awake state at every wakeup interval of a predetermined period to receive the TIM element transmitted by the AP 210. Each STA may calculate a switching time to switch to the awake state, based on its own local clock. In the example shown in FIG. 15, it is assumed that the clock of the STA coincides with that of the AP.

For example, the predetermined wakeup interval may be set in such a manner that STA1 220 can switch to the awake state at every beacon interval to receive the TIM element. Accordingly, when AP 210 transmits the beacon frame for the first time (S211), STA1 220 may switch to the awake state (S221). Thereby, STA1 220 may receive the beacon frame and acquire the TIM element. If the acquired TIM element indicates that there is a frame to be transmitted to STA1 220, STA1 220 may transmit a power save-Poll (PS-Poll) frame, which requests transmission of the frame, to the AP 210 (S221a). In response to the PS-Poll frame, the AP 210 may transmit the frame to STA 1 220 (S231). After completing reception of the frame, STA1 220 is switched back to the sleep state to operate in the sleep state.

When the AP 210 transmits the beacon frame for the second time, the medium is in the busy state in which the medium is accessed by another device, and accordingly the AP 210 may not transmit the beacon frame at the correct beacon interval, but may transmit the beacon frame at a delayed time (S212). In this case, STA1 220 is switched to the awake state in accordance with the beacon interval, but does not receive the beacon frame whose transmission is delayed, and is thus switched back to the sleep state (S222).

When the AP 210 thirdly transmits the beacon frame, the beacon frame may include a TIM element set to a DTIM. However, since the medium is in the busy state, the AP 210 transmits the beacon frame at a delayed time (S213). STA1 220 is switched to the awake state in accordance with the beacon interval, and may acquire the DTIM through the beacon frame transmitted by the AP 210. It is assumed that the DTIM acquired by STA1 220 indicates that there is no frame to be transmitted to STA1 220, but there is a frame for another STA. In this case, STA1 220 may confirm that there is no frame to receive and be switched back to the sleep state to operate in the sleep state. After transmission of the beacon frame, the AP 210 transmits the frame to the corresponding STA (S232).

The AP 210 fourthly transmits the beacon frame (S214). STA1 220 may adjust the wakeup interval for reception of the TIM element since it did not acquire information indicating presence of buffered traffic for STA1 220 through the two previous operations of reception of the TIM element. Alternatively, provided that signaling information for adjustment of the value of the wakeup interval of STA1 220 is contained in the beacon frame transmitted by the AP 210, the wakeup interval value of the STA1 220 may be adjusted. In this example, STA1 220 may be set to be switched to the awake state once at every three beacon intervals to receive a TIM element rather than being set to be switched between the operating states at every beacon interval. Therefore, when the AP 210 fifthly transmits the beacon frame (S215) after the fourth transmission of the beacon frame (S214), STA1 220 maintains the sleep state, and thus cannot acquire the corresponding TIM element.

When AP 210 sixthly transmits the beacon frame (S216), STA1 220 may be switched to the awake state and acquire the TIM element contained in the beacon frame (S224). Since the TIM element is a DTIM indicating presence of a broadcast frame, STA1 220 may receive the broadcast frame transmitted by the AP 210 without transmitting a PS-Poll frame to the AP 210 (S234). In the meantime, the wakeup interval set by STA2 230 may have a greater length than the wakeup interval of STA1 220. Accordingly, STA2 230 is switched to the awake state at a time point (S215) when the AP 210 fifthly transmits the beacon frame, such that the STA2 230 may receive the TIM element (S241). STA2 230 may recognize presence of a frame to be transmitted thereto through the TIM element and transmit the PS-Poll frame to the AP 210 in order to request frame transmission (S241*a*). The AP 210 may transmit the frame to STA2 230 in response to the PS-Poll frame (S233).

In order to operate/manage the PS mode as shown in FIG. 16, the TIM element includes a TIM indicating presence or absence of a frame to be transmitted to the STA or a DTIM indicating presence or absence of a broadcast/multicast frame. The DTIM may be implemented through field setting for the TIM element.

Figure 17:
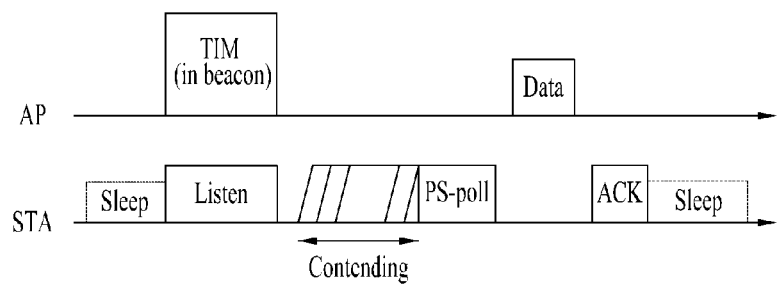
FIGS. 17 to 19 illustrate operations of an STA having received a TIM in detail.
Figure 18:
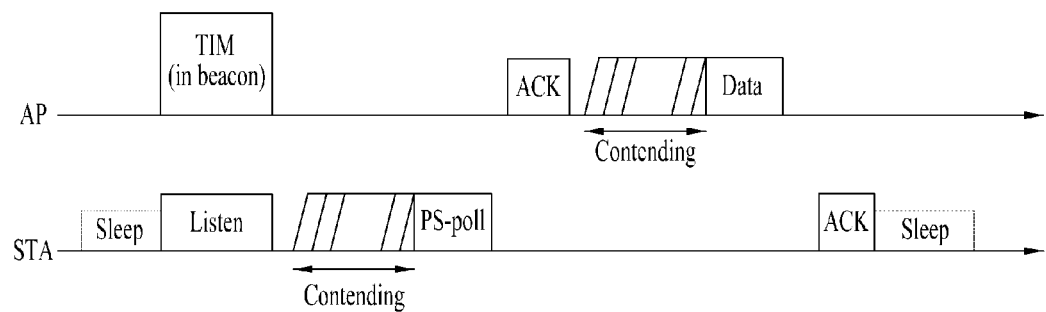
Figure 19:
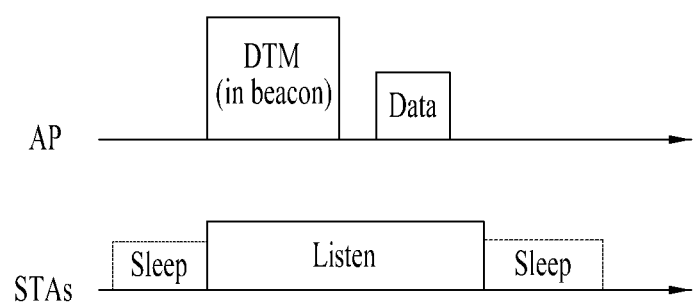

FIGS. 17 to 19 illustrate operations of an STA having received a TIM in detail.

Referring to FIG. 17, an STA is switched from the sleep state to the awake state to receive the beacon frame including a TIM from the AP. The STA interprets the received TIM element such that it can recognize presence of buffered traffic to be transmitted thereto. After the STA contends with other STAs to access the medium for PS-Poll frame transmission, the STA may transmit a PS-Poll frame to the AP to request data frame transmission. The AP, upon receiving the PS-Poll frame transmitted from the STA, may transmit the frame to the STA. The STA may receive the data frame and transmit an ACK frame to the AP in response to the received data frame. Thereafter, the STA may be switched back to the sleep state.

As shown in FIG. 17, the AP may operate in a manner of immediate response in which the AP transmits the data frame when a predetermined time (e.g., a short inter-frame space (SIFS)) elapses after the AP receives the PS-Poll frame from the STA. However, the AP may operate in a manner of deferred response if the AP fails to prepare a data frame to be transmitted to the STA for the SIFS time after receiving the PS-Poll frame, which will be described in detail with reference to FIG. 18.

In the example of FIG. 18, the operations of the STA of switching from the sleep state to the awake state, receiving a TIM from the AP, and transmitting the PS-Poll frame to the AP through contention are identical to those in the example of FIG. 16. If the AP having received the PS-Poll frame fails to prepare a data frame for the SIFS time, the AP may transmit an ACK frame to the STA instead of transmitting the data frame. If the data frame is prepared after transmission of the ACK frame, the AP may perform contention and transmit the data frame to the STA. The STA may transmit the ACK frame indicating successful reception of the data frame to the AP, and then be switched to the sleep state.

FIG. 19 shows an exemplary case in which AP transmits DTIM. STAs may be switched from the sleep state to the awake state so as to receive the beacon frame including a DTIM element from the AP. The STAs may recognize, through the received DTIM, that a multicast/broadcast frame will be transmitted. After transmitting the beacon frame including the DTIM, the AP may immediately transmit data (i.e., a multicast/broadcast frame) without transmitting/receiving the PS-Poll frame. While the STAs continue to maintain the awake state even after receiving the beacon frame including the DTIM, the STAs may receive data and then switch back to the sleep state after data reception is completed.

TIM Structure

In the operation and management method of the power save (PS) mode based on the TIM (or DTIM) protocol described above with reference to FIGS. 16 to 19, STAs may determine presence or absence of a data frame to be transmitted therefor through STA identification information contained in the TIM element. STA identification information may be specific information associated with an association identifier (AID) to be allocated when an STA is associated with an AP.

The AID is used as a unique ID of each STA within a BSS. For example, in the current WLAN system, an AID may be assigned a value between 1 and 2007. In the currently defined WLAN system, 14 bits for the AID may be allocated to a frame transmitted by an AP and/or an STA. Although the AID may be assigned any value up to 16383, the values from 2008 to 16383 are set as reserved values.

The TIM element according to legacy definition is inappropriate for M2M application in which a large number of STAs (e.g., at least 2007 STAs) are associated with one AP. If the conventional TIM structure is extended without any change, the TIM bitmap size may excessively increase. Accordingly, it may be impossible to support the extended TIM structure using the legacy frame format, and the extended TIM structure is inappropriate for M2M communication in which application of a low transfer rate is considered. In addition, it is expected that the number of STAs having a reception data frame during one beacon period is very small. Therefore, in view of the aforementioned exemplary application of M2M communication, it is expected that a TIM bitmap has a large size with most bits set to zero (0) in many cases. Therefore, there is a need for a technology capable of efficiently compressing a bitmap.

In the legacy bitmap compression technology, a series of 0s is omitted from the front part of a bitmap to define an offset (or start point) value. However, compression efficiency is not high in the case in which the number of STAs including a buffered frame is small, but there is a high difference between AID values of the STAs. For example, in the case in which a frame to be transmitted only to STAs whose AIDs are set to 10 and 2000 is buffered, the length of the compressed bitmap is 1990, but all the parts of the bit map other than both end parts are set to zero (0). If the number of STAs associated with one AP is small, inefficiency of bitmap compression may not be a serious problem. However, if the number of STAs associated with one AP increases, such inefficiency may deteriorate overall system performance.

In order to address this issue, AIDs may be divided into a plurality of groups such that data can be more efficiently transmitted with the AIDs. A designated group ID (GID) is allocated to each group. Hereinafter, AIDs allocated on the group basis will be described with reference to FIG. 20.

Figure 20:
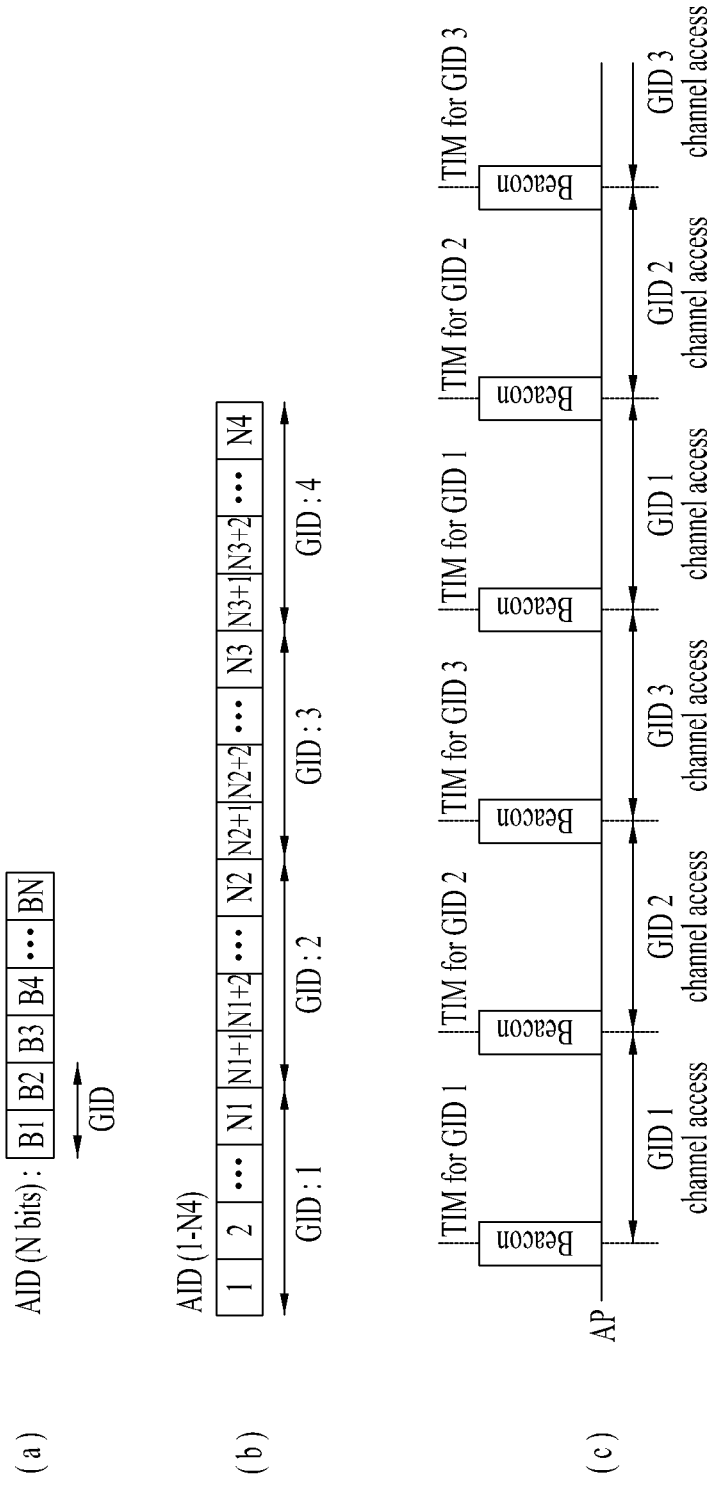
FIG. 20 illustrates a group-based AID.

FIG. 20(*a*) is a diagram illustrating an exemplary AID allocated on the group basis. In FIG. 20(*a*), some bits located at the front part of the AID bitmap may be used to indicate a group ID (GID). For example, the first two bits of an AID bitmap may be used to designate four GIDs. If the total length of the AID bitmap is N bits, the first two bits (B1 and B2) may represent a GID of a corresponding AID.

FIG. 20(b) is a diagram illustrating another exemplary AID allocated on the group basis. In FIG. 20(b), a GID may be allocated according to the position of an AID. In this case, AIDs having the same GID may be represented by an offset and a length value. For example, if GID 1 is denoted by an offset of A and a length of B, this means that AIDs A to A+B−1 on a bitmap are set to GID 1. For example, FIG. 20(b) assumes that AIDs 1 to N4 are divided into four groups. In this case, AIDs belonging to GID 1 are denoted by 1 to N1, and may be represented by an offset of 1 and a length of N1. AIDs belonging to GID 2 may be represented by an offset of N1+1 and a length of N2−N1+1, AIDs belonging to GID 3 may be represented by an offset of N2+1 and a length of N3−N2+1, and AIDs belonging to GID 4 may be represented by an offset of N3+1 and a length of N4−N3+1.

If AIDs allocated on the group basis are introduced, channel access may be allowed in different time intervals according to GIDs. Thereby, the problem of lack of TIM elements for a large number of STAs may be solved and at the same time data transmission/reception may be efficiently performed. For example, in a specific time interval, channel access is allowed only for STA(s) corresponding to a specific group, and channel access of the remaining STA(s) may be restricted. A predetermined time interval in which only specific STA(s) is allowed to perform channel access may be referred to as a restricted access window (RAW).

Hereinafter, channel access based on GIDs will be described with reference to FIG. 20(c). FIG. 20(c) illustrates an exemplary channel access mechanism according to beacon intervals with AIDs divided into three groups. A first beacon interval (or a first RAW) is an interval in which channel access of an STA corresponding to an AID belonging to GID 1 is allowed, and channel access of STAs belonging to the other GIDs is not allowed. To implement this mechanism, a TIM element used only for AIDs corresponding to GID 1 is contained in a first beacon frame. A TIM element used only for AIDs corresponding to GID 2 is contained in a second beacon frame. Accordingly, channel access is allowed only for an STA corresponding to the AIDs belonging to GID 2 in a second beacon interval (or a second RAW). A TIM element used only for AIDs corresponding to GID 3 is contained in a third beacon frame. Accordingly, channel access is allowed only for an STA corresponding to the AIDs belonging GID 3 in a third beacon interval (or a third RAW). A TIM element used only for AIDs corresponding GID 1 is contained in a fourth beacon frame. Accordingly, channel access is allowed only for an STA corresponding to the AIDs belonging to GID 1 in a fourth beacon interval (or a fourth RAW). Thereafter, only channel access of an STA corresponding to a specific group indicated by the TIM contained in a corresponding beacon frame may be allowed in each of beacon intervals subsequent to the fifth beacon interval (or in each of RAWs subsequent to the fifth RAW).

While FIG. 20(c) exemplarily shows a case in which the order of allowed GIDs is periodical or cyclical according to the beacon intervals, embodiments of the present invention are not limited thereto. That is, only AID(s) belonging to specific GID(s) may be contained in a TIM element, such that only channel access of STA(s) corresponding to the specific AID(s) is allowed in a specific time interval (for example, a specific RAW), and channel access of the other STA(s) is not allowed.

The aforementioned group-based AID allocation scheme may also be referred to as a hierarchical structure of a TIM. That is, the entirety of an AID space may be divided into a plurality of blocks, and only STA(s) (i.e., STA(s) of a specific group) corresponding to a specific block having a value other than '0' may be allowed to perform channel access. Thereby, a large-sized TIM is divided into small-sized blocks/groups, an STA can easily maintain TIM information, and blocks/groups may be easily managed according to a class, QoS or usage of the STA. While FIG. 20 exemplarily shows a 2-level hierarchy, a hierarchical TIM structure comprised of two or more levels may be configured. For example, the whole AID space may be divided into a plurality of page groups, each page group may be divided into a plurality of blocks, and each block may be divided into a plurality of sub-blocks. In this case, an extended version of the example of FIG. 20(a) may be configured such that first N1 bits in an AID bitmap represent a page ID (PID), the next N2 bits represent a block ID, the next N3 bits represent a sub-block ID, and the remaining bits represent the position of STA bits within a sub-block.

Slotted Channel Access

A system may be operated such that an STA performs channel access at a slot time indicated based on TIM bitmap information. This scheme may be referred to as slotted channel access.

More specifically, an AP may inform an STA associated with a specific AID, through TIM bitmap information, that data for the STA is buffered, and the STA may recognize a slot time at which it can perform channel access, based on the position of the AID associated therewith in the TIM bitmap. That is, slotted channel access refers to a scheme in which an STA is allowed to perform channel access only in a determined slot using a TIM bitmap. Herein, channel access of an STA may mean that the STA transmits a PS-Poll or trigger frame for checking downlink traffic, transmits a null data frame, or transmits a frame containing an uplink data packet.

Figure 21:
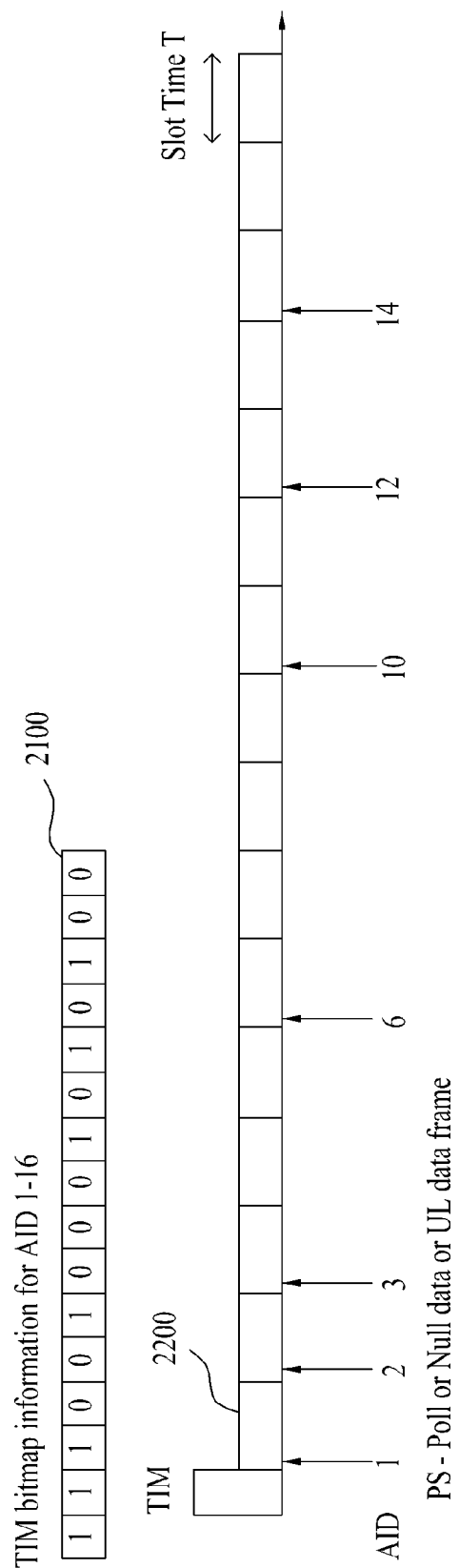
FIGS. 21 and 22 illustrate slotted channel access.

FIG. 21 illustrates an example of slotted channel access.

Referring to FIG. 21, TIM bitmap information 2100 that an AP transmits contains information for AIDs 1 to 16. In TIM bitmap information, a bit (an AID bit) set to '1' indicates that data for an STA corresponding to an AID for the bit is buffered. Accordingly, the STA corresponding to the AID bit of '1' in the TIM bitmap information can start contention at a slot time indicated by the TIM bitmap information. Herein, starting contention means that the STA performs channel access to the AP. For example, in FIG. 21, an STA corresponding to AID 1 may attempt to perform channel access at the first slot 2200 after transmission of a TIM.

Next, the AID bit set to '0' in the TIM bitmap information indicates that there is no data buffered for an STA associated with the AID. Accordingly, in this case, the STA associated with the AID bit set to '0' in the TIM bitmap information recognizes, through the TIM bitmap information, that there is not downlink traffic, and thus does not transmit a PS-Poll or trigger frame for channel access. Thus, it is highly possible that the wireless medium is in the idle state at the slot time corresponding to the AID bit set to '0' in the TIM bitmap information. However, the STA can transmit an uplink data packet to the AP at this slot time.

Figure 22:
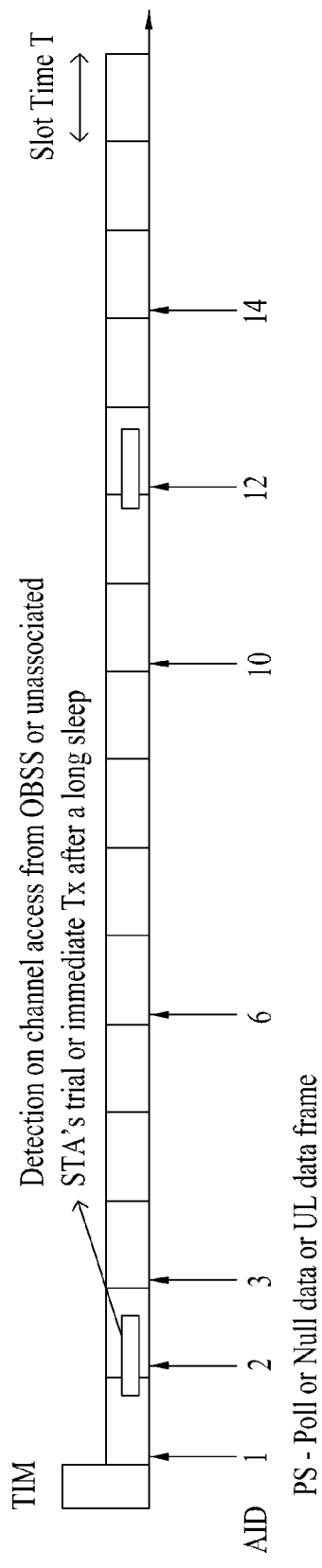

Even if an STA receives TIM bitmap information and preforms channel access at a slot time indicated by the TIM bitmap information, the STA may have difficulty in transmitting a PS-Poll/trigger frame thereof due to channel access of other STAs. In this regard, referring to FIG. 22, an STA with AID 2 that has confirmed that the AID bit is set to 1 in the TIM bitmap information may attempt to transmit a PS-Poll/null data frame/uplink data frame at a second slot time after the time point of reception of a TIM element. In this case, the STA may fail to normally perform channel access if i) channel access from an overlapped BSS (OBSS) occurs, ii) channel access from an unassociated STA occurs, or iii) there is an STA that is switched to the awake state from the long sleep state and immediately attempts channel access (without listening in on a TIM/beacon signal). In the case of a system operated to perform slotted channel access, i.e., to allow an STA to perform channel access at a determined slot time based on TIM bitmap information, the aforementioned problem may occur and deteriorate the system performance since good performance is ensured only when the wireless medium is available at a determined slot time. An STA corresponding to AID 2 may attempt channel access at the next slot time, i.e., at a slot time associated with AID 3 to address the above problem. However, this scheme is not sufficient since this scheme causes the STA corresponding to AID 2 to unnecessarily perform contention for channel access with the STA having AID 3.

In the case in which there is no or a very small number of paged STAs indicated in a TIM bitmap, it may be more advantageous in terms of contention avoidance to make the STAs perform channel access at a slot time at which the wireless medium is highly likely to be idle, rather than to set the STAs to perform contention with an STA paged at a corresponding slot time to transmit a PS-POLL/trigger frame for reception of DL traffic. Hereinafter, an efficient TIM-based channel access method for an STA that can address the aforementioned problem will be described from this point of view.

Embodiment

In a system to which slotted channel access is applied, an STA (a first STA) may be set to attempt channel access at a slot time (unpaged slot time) corresponding to an AID set to '0' in a TIM bitmap if the STA senses a wireless medium-related operation (use of the wireless medium or channel access) of another STA (a second STA) at the slot time thereof. Herein, the unpaged slot time at which channel access is not attempted may be the next unpaged slot time or a randomly selected slot time.

Figure 23:
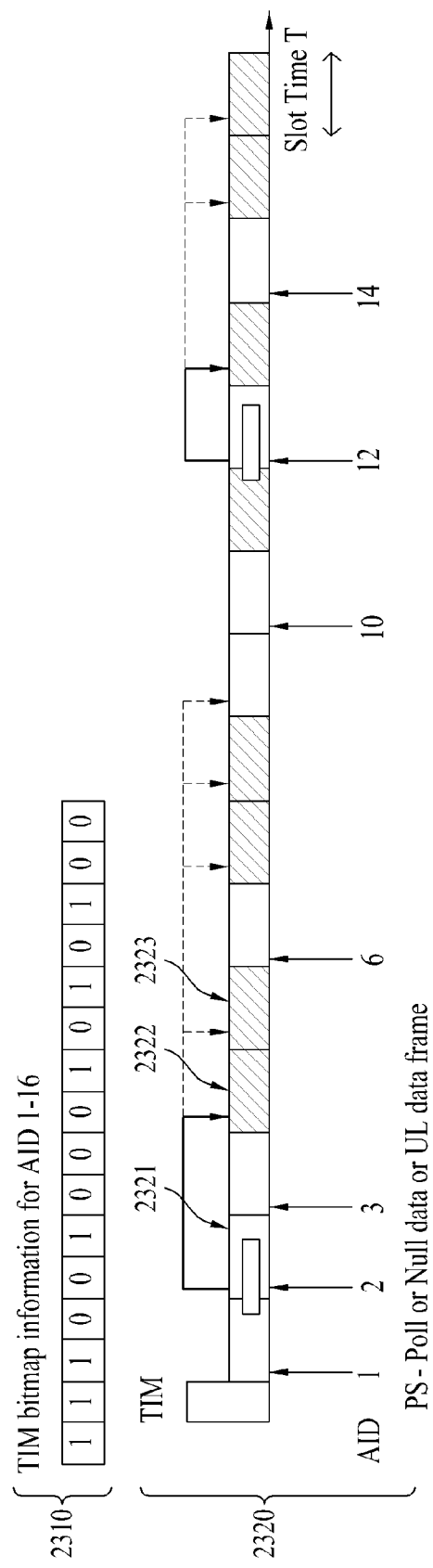
FIGS. 23 and 24 illustrate slotted channel access according to one embodiment of the present invention.

In this regard, a more detailed description will be given with reference to FIG. 23. As in the previous examples of FIGS. 21 to 23, FIG. 23 exemplarily shows TIM bitmap information 2310 corresponding to AIDs 1 to 16 and a timeline 2320 on the slot time basis. FIG. 23 assumes that an STA that receives the TIM bitmap information 2310 is a first STA with AID 2. The first STA recognizes that an AP has DL traffic therefor by checking the AID bit in the TIM bitmap information 2310 which is set to '1'. Accordingly, the first STA may attempt channel access at a first time interval (the second slot time 2321 after receiving the TIM bitmap) indicated by the TIM bitmap information. Herein, attempting channel access means transmission of a frame for channel access. The frame for channel access may be a PS-Poll frame or a channel access request frame (trigger frame) and include a null data frame/UL data frame.

Subsequently, if the first STA senses a wireless medium-related operation of the second STA during attempt of channel access in a first time interval 2321 indicated by the TIM bitmap, it may attempt channel access in a third time interval which is one of second time intervals (hatched blocks in FIG. 23) of the slot time corresponding to the AID bit set to '0' in the TIM bitmap. Herein, the wireless medium-related operation of the second STA refers to use of the wireless medium by the second STA or channel access by the second STA. In addition, channel access by the second STA may correspond to transmission of a frame by an STA of an OBSS, transmission of a frame by a non-cooperative STA, transmission of a frame by an STA switched from a long sleep state, or transmission of a frame by an STA associated with an AID which does not correspond to the TIM bitmap.

The third time interval mentioned above may be i) the earliest time slot 2322 after the first time interval 2321 from among the second time intervals or ii) a time slot randomly selected from among the second time intervals.

In case i), if use of the wireless medium is sensed in time slot 2322, the STA may attempt channel access at the next unpaged time slot 2323. This scheme is advantageous in that an STA attempting slot hopping can attempt channel access with a minimum delay in a case in which the positions of AIDs of the STA are distributed to a certain degree in the time domain or in a case in which a paged slot and an unpaged slot are alternately arranged to a certain degree.

In case ii), a time slot at which the STA attempts access is randomly selected from among the second time intervals. This scheme may be effective in a case in which the number of STAs attempting slot hopping is small or in a case in which the STAs attempting slot hopping are concentrated at a specific slot time.

One of slot hopping schemes i) and ii) may be invariably used in a system, or the slot hopping schemes may be dynamically managed depending on the situation/distribution/number of paged STAs. For example, an indicator such as a slot hopping configuration indicator may be carried on TIM/beacon signaling to inform STAs that one of the schemes i) and ii) is used.

According to the above embodiment, possibility of contention in a specific situation may be significantly reduced. More specifically, in FIG. 23, if an STA with AID 2 attempts slot hopping at the slot time of AID 3, contention with a PS-Poll/trigger frame for channel access transmitted by the STA with ADI 3 may occur. In the method of the embodiment, the probability that the STA with AID 2 successfully performs access may increase since the STA attempts access at a slot time at which it is rarely possible for other STAs to attempt access.

Figure 24:
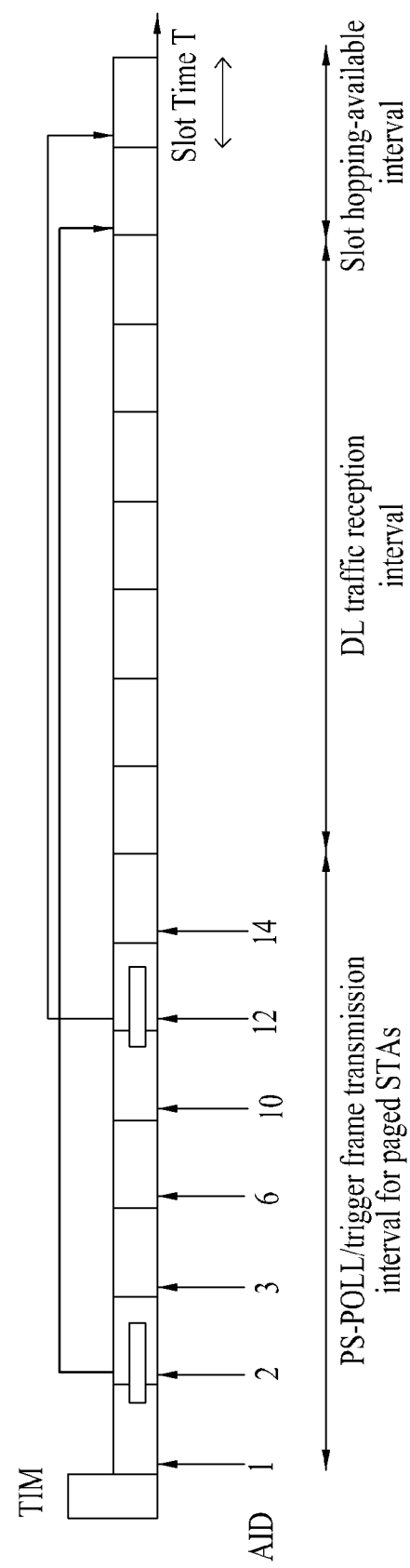

The embodiment of the present invention described above is applicable to various systems in which frames of an STA including a PS-Poll/trigger frame, a null data frame, and a UL data packet are managed based on TIM bitmap information according to a specific pattern or rule. For example, the embodiment is applicable even to a case in which a PS-POLL/trigger frame transmission interval of paged STAs and a DL traffic reception interval are separated from each other as shown in FIG. 24. In FIG. 24, the slot hopping-enabled slot time interval may be set in relation to the number of AIDs set to '0' in a TIM bitmap. In addition, unlike the illustrated example, the slot hopping-enabled slot time interval may be located between the PS-POLL/trigger frame transmission interval of the paged STAs and the DL traffic reception interval.

Figure 25:
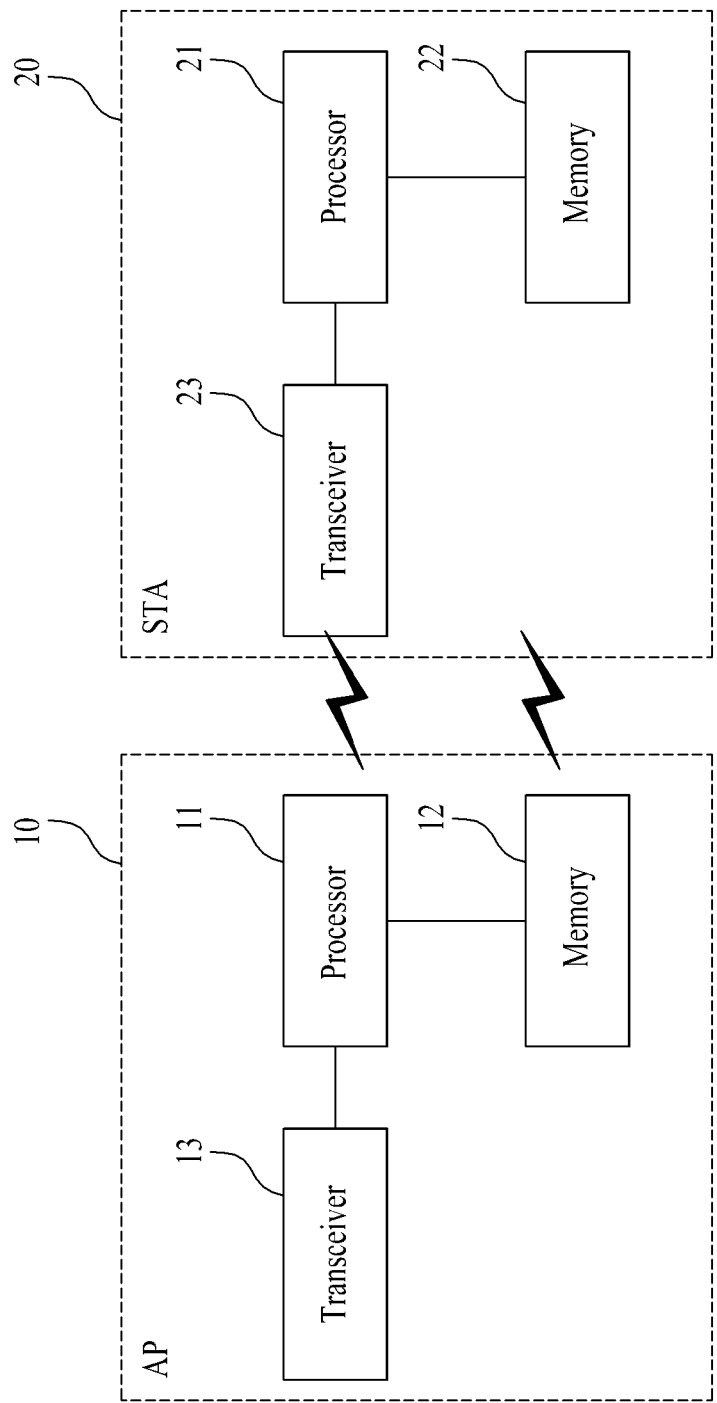
FIG. 25 is a block diagram illustrating a radio frequency apparatus according to one embodiment of the present invention.

FIG. 25 is a block diagram illustrating a radio frequency device according to one embodiment of the present invention.

An AP 10 may include a processor 11, a memory 12, and a transceiver 13. An STA 20 may include a processor 21, a memory 22, and a transceiver 23. The transceivers 13 and 23 may transmit/receive a radio frequency signal and implement a physical layer according to an IEEE 802 system. The processors 11 and 21 may be connected to the transceivers 13 and 21 to implement a physical layer and/or a MAC layer according to an IEEE 802 system. The processors 11 and 21 may be configured to perform various operations according to the various embodiments of the present invention described above. In addition, modules to perform operations of an AP and an STA according to the various embodiments of the present invention described above may be stored in the memories 12 and 22 and run by the processors 11 and 21. The memories 12 and 22 may be contained in the processors 11 and 21 or may be installed at the exterior of the processors 11 and 21 and connected to the processors 11 and 21 by a well-known means.

Constituents of the AP and the STA may be provided such that details of the various embodiments of the present invention described above are independently employed or two or more embodiments are simultaneously implemented. For clarity, redundant descriptions have been omitted.

The embodiments of the present invention described above may be implemented by various means. For example, the embodiments of the present invention may be implemented by hardware, firmware, software, or a combination thereof.

When implemented by hardware, a method according to embodiments of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When embodied in firmware or software, a method according to the embodiments of the present invention may be implemented in the form of a module, a procedure, a function, or the like which performs the functions or operations described above. Software code may be stored in a memory unit and executed by the processor. The memory unit may be disposed inside or outside the processor to transceive data with the processor through various well-known means.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention without departing from the spirit and scope of the present invention. Thus, the present invention is not intended to be limited to the embodiments described herein, but is intended to have the widest scope consistent with the principles and novel features disclosed herein.

INDUSTRIAL APPLICABILITY

Various embodiments of the present invention have been described through examples applied to an IEEE 802.11 system, but they may also be applied to various wireless access systems other than the IEEE 802.11 system.

The invention claimed is:

1. A method for performing channel access by a station (STA) in a wireless communication system, the method comprising:
    receiving, by the STA, a traffic indication map (TIM) bitmap; and
    attempting, by the STA, channel access to a wireless medium during a time interval allocated to an association identity (AID) associated with the STA when the TIM bitmap indicates a value of "1" for the AID associated with the STA,
    wherein the TIM bitmap indicates a plurality of values, each corresponding to one of a plurality of AIDs,
    wherein a different time interval is respectively allocated to each of the plurality of AIDs regardless of the value indicated by the TIM bitmap for each of the plurality of AIDs,
    wherein, when the STA senses an operation of another one of a plurality of STAs related to the wireless medium during the time interval allocated to the AID associated with the STA, the STA additionally attempts channel access to the wireless medium during another time interval among the different time intervals allocated to the plurality of AIDs,
    wherein the another time interval is a time interval corresponding to an AID for which the value indicated by the TIM bitmap is "0",
    wherein the time interval corresponding to the AID for which the value indicated by the TIM bitmap is "0" is a time interval in which downlink traffic is unpaged,
    wherein channel access by another one of a plurality of STAs corresponds to transmission of a frame by one of an STA of an OBSS (Overlapped Basic Service Set), a non-cooperative STA, an STA switched from a long sleep state, and an STA associated with an AID not corresponding to the TIM bitmap, and
    wherein the frame is one of a power save (PS)-Poll, a null data frame or an uplink data packet.

2. The method according to claim 1,
    wherein the another time interval is a closest time interval to the time interval allocated to the STA among the different time intervals in which downlink traffic is unpaged, and
    wherein the closest time interval is after the time interval allocated to the STA.

3. The method according to claim 1, wherein the another time interval is randomly selected from among the different time intervals in which downlink traffic is unpaged.

4. The method according to claim 1, further comprising:
    receiving a slot hopping configuration indicator,
    wherein the another time interval is determined to be a closest time interval to the time interval allocated to the STA among the different time intervals in which downlink traffic is unpaged or a time interval randomly selected from among the different time intervals in which downlink traffic is unpaged, and
    wherein the another time interval is after the time interval allocated to the STA.

5. The method according to claim 1, wherein the operation of another one of a plurality of STAs related to the wireless medium comprises use of the wireless medium by the another one of the plurality of STAs or channel access by the another one of the plurality of STAs.

6. The method according to claim 1, wherein attempting channel access comprises transmitting a frame.

7. The method according to claim 6, wherein the frame is a PS-Poll or a channel access request frame.

8. A method for supporting channel access of a station (STA) by an access point (AP) in a wireless communication system, comprising:
    transmitting, by the AP, a traffic indication map (TIM) bitmap; and
    receiving, by the AP, a frame for channel access to a wireless medium from the STA during a time interval allocated to an association identity (AID) associated with the STA when the TIM bitmap indicates a value of "1" for the AID associated with the STA, wherein the TIM bitmap indicates a plurality of values, each corresponding to one of a plurality of AIDs, wherein a different time interval is respectively allocated to each of the plurality of AIDs regardless of the value indicated by the TIM bitmap for each of the plurality of AIDs, wherein the another time interval is a time interval corresponding to an AID for which the value indicated by the TIM bitmap is "0", wherein the time interval corresponding to the AID for which the value indicated by the TIM bitmap is "0" is a time interval in which downlink traffic is unpaged, wherein channel access by another one of a plurality of STAs corresponds to transmission of a frame by one of an STA of an OBSS (Overlapped Basic Service Set), a non-cooperative STA, an STA switched from a long sleep state, and an STA associated with an AID not corresponding to the TIM bitmap, and wherein the frame is one of a power save (PS)-Poll, a null data frame or an uplink data packet.

9. A station (STA) in a wireless communication system comprising:

a transceiver for transmission and reception of a radio frequency signal; and a processor that controls the transceiver to receive a traffic indication map (TIM) bitmap, and that attempts channel access to a wireless medium during a time interval allocated to an association identity (AID) associated with the STA when the TIM bitmap indicates a value of "1" for the AID associated with the STA, wherein the TIM bitmap indicates a plurality of values, each corresponding to one of a plurality of AIDs, wherein a different time interval is respectively allocated to each of the plurality of AIDs regardless of the value indicated by the TIM bitmap for each of the plurality of AIDs, wherein, when the STA senses an operation of another STA related to the wireless medium in the time interval allocated to the AID associated with the STA, the STA additionally attempts channel access to the wireless medium during another time interval among the different time intervals allocated to the plurality of AIDs, wherein the another time interval is a time interval corresponding to an AID for which the value indicated by the TIM bitmap is "0", wherein the time interval corresponding to the AID for which the value indicated by the TIM bitmap is "0" is a time interval in which downlink traffic is unpaged, wherein channel access by another one of a plurality of STAs corresponds to transmission of a frame by one of an STA of an OBSS (Overlapped Basic Service Set), a non-cooperative STA, an STA switched from a long sleep state, and an STA associated with an AID not corresponding to the TIM bitmap, and wherein the frame is one of a power save (PS)-Poll, a null data frame or an uplink data packet.

10. An access point (AP) in a wireless communication system comprising:

a transceiver for transmission and reception of a radio frequency signal; and a processor that controls the transceiver to transmit a traffic indication map (TIM) bitmap, and receive a frame for channel access to a wireless medium from the STA during a time interval allocated to an association identity (AID) associated with the STA when the TIM bitmap indicates a value of "1" for the AID associated with the STA, wherein the TIM bitmap indicates a plurality of values, each corresponding to one of a plurality of AIDs, wherein a different time interval is respectively allocated to each of the plurality of AIDs regardless of the value indicated by the TIM bitmap for each of the plurality of AIDs, wherein, when an operation of another one of a plurality of STAs related to the wireless medium is performed during the time interval allocated to the AID associated with the STA, the frame for channel access is received from the STA during another time interval among the different time intervals allocated to the plurality of AIDs, wherein the another time interval is a time interval corresponding to an AID for which the value indicated by the TIM bitmap is "0", wherein the time interval corresponding to the AID for which the value indicated by the TIM bitmap is "0" is a time interval in which downlink traffic is unpaged, wherein channel access by another one of a plurality of STAs corresponds to transmission of a frame by one of an STA of an OBSS (Overlapped Basic Service Set), a non-cooperative STA, an STA switched from a long sleep state, and an STA associated with an AID not corresponding to the TIM bitmap, and wherein the frame is one of a power save (PS)-Poll, a null data frame or an uplink data packet.

* * * * *